United States Patent
Ohkubo et al.

(10) Patent No.: US 7,457,230 B2
(45) Date of Patent: Nov. 25, 2008

(54) SENDING RADIO STATION, RECEIVING RADIO STATION, RADIO COMMUNICATION SYSTEM, AND RADIO COMMUNICATION METHOD

(75) Inventors: Shinzo Ohkubo, Yokosuka (JP); Toru Otsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 815 days.

(21) Appl. No.: 10/767,370

(22) Filed: Jan. 30, 2004

(65) Prior Publication Data

US 2004/0258098 A1 Dec. 23, 2004

(30) Foreign Application Priority Data

Jan. 31, 2003 (JP) ............................ P2003-025013

(51) Int. Cl.
*H04Q 7/36* (2006.01)
(52) U.S. Cl. ...................... 370/208; 370/343; 455/444; 455/449
(58) Field of Classification Search ................. 370/208, 370/343, 482; 455/444, 449
See application file for complete search history.

(56) References Cited

U.S. PATENT DOCUMENTS

| | | | |
|---|---|---|---|
| 5,875,179 A | 2/1999 | Tikalsky | |
| 6,785,513 B1* | 8/2004 | Sivaprakasam | ............ 455/63.1 |
| 2002/0082019 A1 | 6/2002 | Sunay et al. | |
| 2002/0085516 A1 | 7/2002 | Bridelall | |
| 2002/0150125 A1 | 10/2002 | Nago | |
| 2002/0187780 A1 | 12/2002 | Souissi | |
| 2003/0013452 A1* | 1/2003 | Hunt et al. | ................... 455/449 |
| 2004/0037215 A1* | 2/2004 | Hwang et al. | ............... 370/203 |
| 2006/0250935 A1* | 11/2006 | Hamamoto et al. | ......... 370/203 |

FOREIGN PATENT DOCUMENTS

EP 0 954 122 11/1999

(Continued)

OTHER PUBLICATIONS

Hiroyuki Atarashi et al, "Broadband Wireless Access Based on Forward Link VSF-OFCDM and Reverse Link MC/DS-CDMA", Wireless Laboratories, NTT DoCoMo, Inc., Aug. 20, 2002, p. 337.

*Primary Examiner*—Melvin Marcelo
(74) *Attorney, Agent, or Firm*—Oblon, Spivak, McClelland, Maier & Neustadt, P.C.

(57) ABSTRACT

A method, device and system for arranging symbols to be sent in the frequency axis and for sending signals to a radio terminal inside an area using one or a plurality of carrier frequency bands, in a radio communication system with a hierarchical cell structure. The method includes detecting by a device at least one carrier frequency band signal pertaining to a transmission system other than that of its own station. A sending-symbol synchronization is detected based on at least one received signal upon detecting the carrier frequency band signal pertaining to the transmission system other than that of its own station. The signal is sent based on the derived symbol sending timing.

20 Claims, 15 Drawing Sheets

FOREIGN PATENT DOCUMENTS

| | | |
|---|---|---|
| EP | 0 957 607 | 11/1999 |
| EP | 1 073 216 | 1/2001 |
| EP | 1 079 576 A2 | 2/2001 |
| EP | 1 087 629 | 3/2001 |
| GB | 2 313 984 | 12/1997 |
| JP | 7-283806 | 10/1995 |
| JP | 10-290211 | 10/1998 |
| JP | 11-178036 | 7/1999 |
| JP | 2002-335556 | 11/2002 |
| WO | WO 00/51366 | 8/2000 |

\* cited by examiner

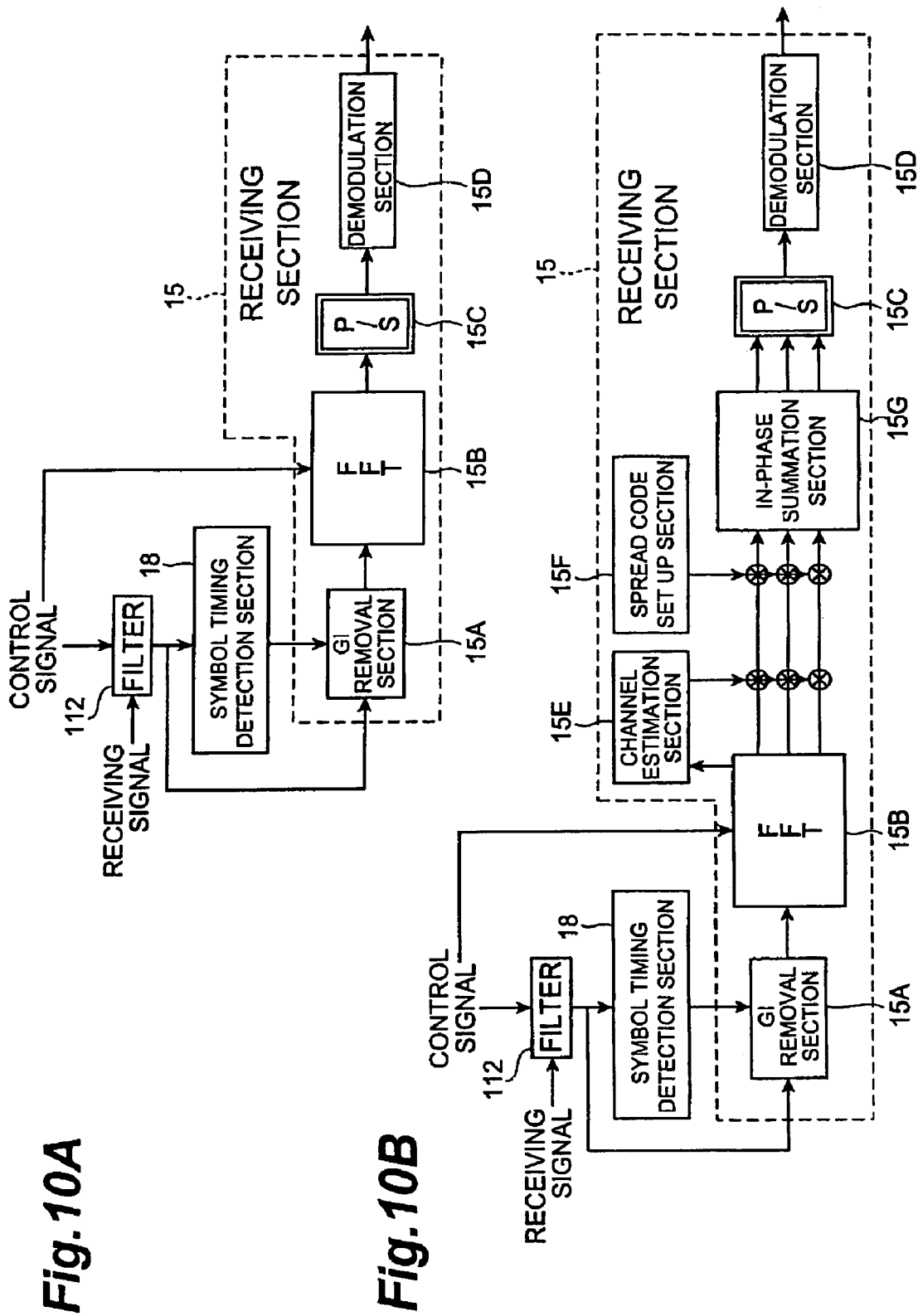

SENDING RADIO STATION, RECEIVING RADIO STATION, RADIO COMMUNICATION SYSTEM, AND RADIO COMMUNICATION METHOD

BACKGROUND OF THE INVENTION

1. Field of the Invention

The present invention relates to a sending radio station, a receiving radio station, a radio communication system, and a radio communication method in a radio communication system (for example, the radio communication system which executes OFDM (Orthogonal Frequency Division Multiplexing) transmission or OFCDM (Orthogonal Frequency Code Division Multiplexing) transmission) with a hierarchical cell structure (so-called cell-in-cell structure) for executing data transmission using orthogonal carrier frequency bands.

2. Related Background Art

In FIG. 1, there is shown a radio sending system using one or more sending radio stations which control a certain range of area 90, and a sending radio station forming a small scale cell 80 which can receive signal from the one or more sending radio stations and has smaller Equivalent Isotropically Radiated Power (EIRP) as compared with the one or more sending radio stations. In addition, in the description of this specification, one or more sending radio stations controlling the certain range 90 will be referred to as a "large cell sending radio station" and the sending radio station having small EIRP as compared with the large cell sending radio station and forming the small scale cell 80 will be referred to as a "small cell sending radio station". Moreover, as shown in FIG. 1, it is assumed that the large cell sending radio station uses a frequency band f1, and the small cell sending radio station uses a frequency band f2.

In FIG. 2, a functional block configuration of a conventional sending radio station 1 having small EIRP and a conventional receiving radio station 11 is shown. As shown in this FIG. 2, in the receiving radio station 11, in order to receive data sent from each sending base station in the receiving radio station 11, it was necessary that after the data having been separated by a filter 12 which passes only the frequency band f1 and stops the frequency band f2, and a filter 13 which passes only the frequency band f2 and stops the frequency band f1, respectively, a desired frequency band is selected out of the separated frequency bands by a switcher 14 and inputted to a receiving section 15. This is because the signal of the frequency band not supposed to be received will cause no deterioration of the reception quality due to interferences at the time of the demodulation.

On the other hand, techniques involving a method of symbol synchronization have been proposed in the prior art, and, for example, a technique involving the method of symbol synchronization in the relay station of the broadcast field has been disclosed in Japanese patent laid-open gazette, Heisei 7-283806.

SUMMARY OF THE INVENTION

However, the radio communications related to mobile communications has peculiar features, lacking in the communications of other fields, in that receiving radio stations, such as mobile terminals, move across various cells or areas. For this reason, it is necessary to carry out hand-over, which switches over the sending radio station that is to be an opposite communication party of the receiving radio station. At the time of this hand-over, in the receiving radio station 11 of FIG. 2, it was necessary to demodulate the receiving signal after a switch over having taken place from the preceding frequency band to the desired frequency band at the switcher 14, so that it was difficult to achieve a smooth hand-over from the frequency band f1 to the frequency band f2 or from the frequency band f2 to the frequency band f1.

The present invention has been made in order to solve the above-mentioned problem, and the object of the invention is to provide a sending radio station, a receiving radio station, a radio communication system, and a radio communications method, whereby a smooth hand-over can be achieved.

In order to achieve the above mentioned object, a sending radio station according to the present invention, is the sending radio station to arrange the symbol to be sent in the frequency axis and send signals to a radio terminal inside the area using one or a plurality of carrier frequency bands, in a radio communication system with a hierarchical cell structure, wherein the sending radio station includes: a signal detection means for detecting at least one carrier frequency band signal being pertaining to a transmission system other than that of its own station; a symbol synchronization detection means for detecting sending-symbol synchronization based on at least one received signal on detecting the carrier frequency band signal pertaining to the transmission system other than that of its own station; and a signal sending means for sending the signal to be sent, at the symbol sending timing derived based on the detected symbol synchronization. In addition, the above mentioned transmission system includes various transmission systems such as frequency band division and spread code division. A symbol refers to the sending data after having been modulated, and includes, for example, control information for synchronization and the like in addition to the actual data. The above mentioned carrier frequency band means a carrier frequency or a subcarrier frequency, and the sending radio station according to the present invention can send data over only one carrier frequency. Moreover, the above mentioned radio terminal means all the terminals located in the area, which can carry out radio communication, and is a concept that includes a receiving radio station (for example, a mobile station), and a sending radio station besides the station of its own. Moreover, "detecting carrier frequency band signal" means both of the case wherein the sending radio station detects the carrier frequency band signal by itself, and the case wherein the sending radio station detects the carrier frequency band signal by receiving a synchronization request signal from the receiving radio station.

In the above mentioned sending radio station, when the signal detection means detects at least one carrier frequency band signal being pertaining to a transmission system other than that of its own station, the symbol synchronization detection means will detect the sending symbol synchronization based on at least one received signal, and the signal sending means will send the signal to be sent, at the symbol sending timing derived based on the detected symbol synchronization. Accordingly, the signal sending means can send the signal at the optimum (namely, causing no interference with each other) symbol sending timing by the correlation between at least one carrier frequency band signal of the transmission system other than that of the station of its own and the signal of the station of its own. Accordingly, since signals of a plurality of carrier frequency bands can be simultaneously received and demodulated by the receiving radio station, there will be no need to carry out a "frequency switch over process" like in the prior art at the time of hand-over, thereby a smooth hand-over can be achieved.

Moreover, the following effects are also obtained incidentally. Since the guard band can be set small or can be unnecessary, the frequency can be effectively utilized. Moreover, since signals from a plurality of sending radio stations can be simultaneously received, multi-link transmission can be carried out. Moreover, new sending radio stations can be freely arranged without much taking into consideration the influence of interference on other existing sending radio stations forming the small cell. Furthermore, since the components for receiving of the receiving radio station which receives a plurality of frequency bands, can be shared, the reduction of capacity of the receiving radio station and the reduction of manufacturing cost can be achieved.

In addition, the signal detection means can detect there have been received a carrier frequency band signal having small Equivalent Isotropically Radiated Power (EIRP) as compared with the signal of the station of its own.

The above mentioned sending radio station can further include the following configuration requirements. Namely, the sending radio station according to the present invention furthermore includes a frequency interval detection means for detecting a frequency interval based on the received signal from a radio terminal, and a frequency set up means for setting up the sending carrier frequency based on the detected frequency interval so as to acquire an orthogonal relationship with respect to the sending carrier. In addition, the above mentioned "radio terminal" means, for example, other sending radio stations which send carrier frequency band signal having larger Equivalent Isotropically Radiated Power (EIRP) than the signal of the sending radio station according to the present invention, and is a concept that includes every terminal (for example, mobile stations and etc.) located in the area that can carry out radio communication.

Moreover, the sending radio station according to the present invention furthermore includes a reception quality measurement means for measuring reception quality based on the received signal from the radio terminal, and a spread coefficient set up means for setting up a spread coefficient based on the reception quality obtained by the measurement. In addition, the above mentioned "radio terminal" also means, for example, other sending radio stations which send carrier frequency band signal having larger Equivalent Isotropically Radiated Power (EIRP) than the signal of the sending radio station according to the present invention, and is a concept that includes all the terminals (for example, mobile stations and etc.) located in the area that can carry out radio communication.

The receiving radio station, which communicates with the above mentioned sending radio station, can be described as follows. Namely, according to the invention there is provided the receiving radio station in a radio communication system with a hierarchical cell structure, for receiving signals from a sending radio station which arranges the symbol to be sent in the frequency axis and sends the signals to a radio terminal inside the area by using one or a plurality of carrier frequency bands, wherein the receiving radio station has a simultaneous reception control means for simultaneously receiving the signals of a plurality of carrier frequency bands and demodulating the signals. As described above, by simultaneously receiving and demodulating the signals of a plurality of carrier frequency band signals by the receiving radio station, there will be no need to carry out the "frequency switch over process" like in the prior art at the time of hand-over, thereby a smooth hand-over can be achieved.

Moreover, the following effects are also obtained incidentally. Since the guard band can be set small or can be unnecessary, the frequency can be effectively utilized. Moreover, since signals from a plurality of sending radio stations can be simultaneously received, multi-link transmission can be carried out. Moreover, new sending radio stations can be freely arranged without much taking into consideration the influence of interference on other existing sending radio stations forming the small cell. Furthermore, since the components for receiving of the receiving radio station which receives a plurality of frequency bands, can be shared, the reduction of capacity of the receiving radio station and the reduction of manufacturing cost can be achieved.

Moreover, it is the characteristic feature of the receiving radio station according to the invention furthermore that the receiving radio station includes a registration means, wherein when the station of its own moves into a small scale cell in the hierarchical cell structure, the registration means will register an information to a data transfer device in the radio communication system, the information indicating that the station of its own is ready for receiving signal from the sending radio station of a large scale cell controlling the area, and ready for receiving signal from the sending radio station of the small scale cell.

Moreover, in the receiving radio station according to the invention, it is the characteristic feature that a simultaneous reception control means selects the signals of at least one carrier frequency band of a different transmission system, and demodulates the signals.

The radio communication system comprised of the above-mentioned sending radio station and receiving radio station can be described as follows. Namely, there is provided a radio communication system according to the invention is the radio communication system with a hierarchical cell structure being comprised of a sending radio station which arranges the symbol to be sent on the frequency axis and sends the signal to a radio terminal inside the area by using one or a plurality of carrier frequency bands, and a receiving radio station which receives the signal from the sending radio station. It is the characteristic feature of the sending radio station that the sending radio station includes a signal detection means for detecting at least one carrier frequency band signal of a transmission system other than that of the station of its own; a symbol synchronization detection means for detecting sending symbol synchronization based on at least one received signal when having detected the carrier frequency band signal of the different transmission system; and a signal sending means for sending the signal to be sent, at the symbol sending timing derived based on the detected symbol synchronization; and the receiving radio station has a simultaneous reception control means for simultaneously receiving the signals of a plurality of carrier frequency bands and demodulating the signals.

In the above mentioned sending radio station, when the signal detection means detects at least one carrier frequency band signal of a transmission system other than that of the station of its own, the symbol synchronization detection means will detect the sending symbol synchronization based on at least one received signal, and the signal sending means will send the signal to be sent, at the symbol sending timing derived based on the detected symbol synchronization. In the receiving radio station, the simultaneous reception control means can simultaneously receive signals of a plurality of carrier frequency bands and demodulate the signals. Accordingly, the sending radio station can send signals at the optimum (namely, causing no interference to each other) symbol sending timing by the correlation between at least one carrier frequency band signal of the transmission system other than that of the station of its own and the signal of the station of its own. Therefore, since in the receiving radio station, the signals of a plurality of carrier frequency bands can be simultaneously received and demodulated, there will be no need to carry out the "frequency switch over process" like in the prior art at the time of hand-over, thereby a smooth hand-over can be achieved.

Moreover, the following effects are also obtained incidentally. Since the guard band can be set small or can be unnecessary, the frequency can be effectively utilized. Moreover, since signals from a plurality of sending radio stations can be simultaneously received, multi-link transmission can be carried out. Moreover, new sending radio stations can be freely arranged without much taking into consideration the influence of interferences on other existing sending radio stations forming the small cell. Furthermore, since the components for receiving of the receiving radio station which receive a plurality of frequency bands, can be shared, the reduction of capacity of the receiving radio station and the reduction of manufacturing cost can be achieved.

The above mentioned receiving radio station can further include the following configuration requirements. Namely, in the radio communication system according to the invention, the receiving radio station furthermore includes a registration means wherein, when the station of its own moves into a small scale cell in the hierarchical cell structure, the registration means will register the information to a data transfer device (for example, a router and the like in the location registration management server which realizes the location registration of a receiving radio station in the network), the information indicating that the station of its own is ready for receiving the signal from the sending radio station of a large scale cell controlling the area, and ready for receiving the signal from the sending radio station of the small scale cell, and the data transfer device will select the sending radio station which sends the data, according to the classification of data to be sent to the receiving radio station.

Namely, when the station of its own moves into a small scale cell in the hierarchical cell structure, the registration means will register an information to a data transfer system in the radio communication system, the information indicating that the station of its own is ready for receiving signal from the sending radio station of a large scale cell controlling the area, and ready for receiving signal from the sending radio station of the small scale cell; and the data transfer device will select the sending radio station which sends the data, according to the classification of the data to be sent to the receiving radio station. Thereby, proper data transmission control according to the classification of the data can be achieved, such that multicasting information is sent from the large cell sending radio station and individual information of high data rate such as image data is sent from the small cell sending radio station, to the receiving radio station.

In addition, regarding the symbol synchronization, the following embodiments can be adopted. Namely, a radio communication system according to the invention is comprised of a plurality of sending radio stations where the carrier frequency bands to be used are different, and a symbol synchronization reference source that sends the reference signal of the symbol synchronization. The plurality of sending radio stations synchronously sends the symbol of the signal which each sending radio station should send, at the symbol sending timing based on the reference signal from the symbol synchronization reference source.

Moreover, the radio communication system according to the present invention is comprised of a plurality of sending radio stations using different carrier frequency bands, wherein the plurality of sending radio stations link each other via a cable or radio, and each sending radio station synchronously sends symbols of the signals to be sent. At this time, it is desirable that the plurality of sending radio stations link each other to set up so that the sending carrier frequency of the signal, by which each sending radio station should send, will be orthogonal to each other.

A radio communication system according to the present invention is the radio communication system with a hierarchical cell structure, comprised of a sending radio station which arranges the symbol to be sent on the frequency axis and sends signals to a radio terminal inside the area by using one or a plurality of carrier frequency bands, and a receiving radio station which receives the signal from the sending radio station; wherein the receiving radio station includes a synchronization request means for requesting the symbol synchronization to the sending radio station, and a simultaneous reception control means for simultaneously receiving the signals of a plurality of carrier frequency bands and demodulating the signals, and the sending radio station includes a symbol synchronization detection means for detecting the sending symbol synchronization based on at least one received signal when a request of the symbol synchronization is received from the receiving radio station and a signal sending means for sending the signal to be sent, at the symbol sending timing derived based on the detected symbol synchronization.

In this radio communication system, when the synchronization request means of the receiving radio station requests symbol synchronization to the sending radio station, the symbol synchronization detection means will detect the symbol synchronization based on at least one received signal, and the signal sending means will send the signal to be sent, at the symbol sending timing derived based on the detected symbol synchronization in the sending radio station. In the receiving radio station, the simultaneous reception control means can simultaneously receive the signals of a plurality of carrier frequency bands and demodulate the signals. Accordingly, the sending radio station can send signal at the optimum (namely, causing no interference to each other) symbol sending timing by the correlation between at least one carrier frequency band signal of the transmission system other than that of the station of its own and the signal of the station of its own. Therefore, in the receiving radio station, since signals of a plurality of carrier frequency bands can be simultaneously received and demodulated, there will be no need to carry out the "frequency switch over process" like in the prior art at the time of hand-over, thereby a smooth hand-over can be achieved.

Moreover, the following effects are also obtained incidentally. Since the guard band can be set small or can be unnecessary, the frequency can be effectively utilized. Moreover, since signals from a plurality of sending radio stations can be simultaneously received, multi-link transmission can be carried out. Moreover, new sending radio stations can be freely arranged without much taking into consideration the influence of interference of other existing sending radio stations forming the small cell. Furthermore, since the components for receiving of the receiving radio station which receive a plurality of frequency bands, can be shared, the reduction of capacity of the receiving radio station and the reduction of manufacturing cost can be achieved.

This invention can be described as an invention related to a method of radio communications as follows. A radio communication method according to the present invention is a radio communication method applicable in a sending radio station to arrange symbols to be sent in the frequency axis and send signals to the radio terminal inside the area using one or a plurality of carrier frequency bands, in the radio communication system with a hierarchical cell structure; wherein the radio communication method includes: a signal detection step wherein the sending radio station detects at least one carrier frequency band signal of a transmission system other than that of its own station; a symbol synchronization detection step wherein the sending radio station detects the sending symbol synchronization based on at least one received signal, on detecting the carrier frequency band signal pertaining to the transmission system other than that of its own station; a signal sending step wherein the sending radio station sends signals to be sent, at the symbol sending timing derived based on the detected symbol synchronization.

Moreover, a radio communication method according to the present invention is a radio communication method applicable in a receiving radio station to receive signals from a sending radio station for arranging symbols to be sent in the frequency axis and sending signals to the radio terminal inside the area using one or a plurality of carrier frequency bands, in the radio communication system with a hierarchical cell structure, wherein the radio communication method includes: a registration step for registering an information to a data transfer device in the radio communication system, the information indicating that when the receiving radio station of its own moves into a small scale cell in the hierarchical cell structure, the station of its own is ready for receiving the signals from the sending radio station of a large scale cell controlling the area and ready for receiving the signals from the sending radio station of the small scale cell; and a simultaneous reception control step for simultaneously receiving the signals of the plurality of carrier frequency bands and demodulating the signals.

Moreover, a radio communication method according to the present invention is a radio communication method in a radio communication system with a hierarchical cell structure comprised of a sending radio station to arrange symbols to be sent in the frequency axis and send signals to a radio terminal inside the area using one or a plurality of carrier frequency bands, and a receiving radio station to receive signals from the sending radio station, wherein the radio communication method includes: a synchronization request step wherein the receiving radio station requests the symbol synchronization to the sending radio station; a symbol synchronization detection step wherein the sending radio station detects the sending symbol synchronization based on at least one received signal, when the sending radio station receives a request of the symbol synchronization from the receiving radio station; and a signal sending step wherein the sending radio station sends signals to be sent, at the symbol sending timing derived based on the detected symbol synchronization.

This invention can be also described as the invention related to a radio communications program as follows. A radio communication program according to the present invention is a radio communication program causing a computer to execute, the computer being provided in a sending radio station to arrange the symbol to be sent in the frequency axis and send signals to the radio terminal inside the area by using one or a plurality of carrier frequency bands, in the radio communication system with a hierarchical cell structure; wherein the radio communications program includes: a signal detection step wherein the sending radio station detects at least one carrier frequency band signal of a transmission system other than that of its own station; a symbol synchronization detection step wherein the sending radio station detects the sending symbol synchronization based on at least one received signal, on detecting the carrier frequency band signal pertaining to the transmission system other than that of its own station; a signal sending step wherein the sending radio station sends signals to be sent, at the symbol sending timing derived based on the detected symbol synchronization.

Moreover, a radio communication program according to the present invention is a radio communication program causing a computer to execute, the computer being provided in a receiving radio station to receive signals from a sending radio station for arranging the symbol to be sent in the frequency axis and sending signals to the radio terminal inside the area using one or a plurality of carrier frequency bands, in the radio communication system with a hierarchical cell structure; wherein the radio communications program includes: a registration step for registering an information to a data transfer device in the radio communication system, the information indicating that when the receiving radio station of its own moves into a small scale cell in the hierarchical cell structure, the station of its own is ready for receiving the signals from the sending radio station of a large scale cell controlling the area and ready for receiving the signals from the sending radio station of the small scale cell; and a simultaneous reception step for simultaneously receiving the signals of the plurality of carrier frequency bands and demodulating the signals.

BRIEF DESCRIPTION OF THE DRAWINGS

FIG. 10A is a functional block diagram showing the configuration related to the reception of OFDM signal in a receiving radio station.

FIG. 10B is a functional block diagram showing the configuration related to the reception of OFCDM signal in a receiving radio station.

DESCRIPTION OF THE PREFERRED EMBODIMENTS

Hereinafter, various kinds of embodiments according to the present invention will be described with reference to drawings.

First Embodiment

The first embodiment of the invention will be described using a view of the functional block configuration of a small cell sending radio station 101 and a receiving radio station 111 in FIG. 3, and a view showing the timing relationship of the receiving symbol from a large cell sending radio station and the sending symbol of a small cell sending radio station in FIG. 4. Moreover, a description will be made according to a case where the large cell sending radio station is using a frequency band f1 and the small cell sending radio station is using a frequency band f2. In addition, a "carrier frequency band" according to the present invention means a carrier frequency or a subcarrier frequency, and the sending radio station can send data by only one carrier.

In the small cell sending radio station 101, a symbol synchronization detection section 105 detects the symbol timing of the data which the large cell sending radio station sends, by receiving signals of the frequency band f1 or a part of the frequency band f1 at the time of turning on the power supply or periodically or continuously. A specific method of the detection can be realized by using a generic method to be practiced by a receiving radio station receiving OFDM signal. The above mentioned symbol synchronization detection section 105 corresponds to the signal receiving detection means and the symbol synchronization detection means according, to the present invention.

Figure 8:
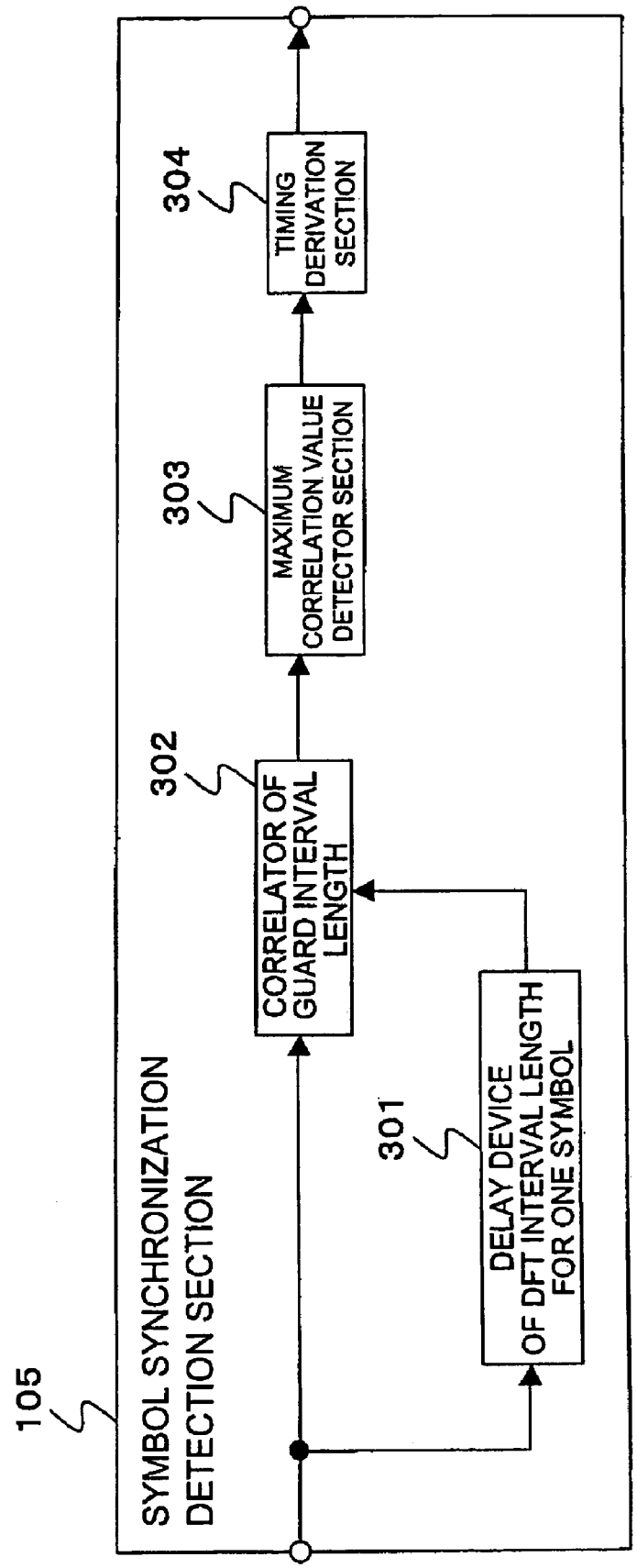
FIG. 8 is an example of the configuration that realizes a symbol synchronization detecting section.

For example, as shown in FIG. 8, the symbol synchronization detection section 105 can be comprised of, a delay device 301 which effects a delay by a length of one symbol DFT interval for each of the inputted signals of a plurality of different transmission systems, a correlator 302 which carries out the correlation between the guard interval length (GI) using a delayed signal and a non-delayed signal, a maximum correlation value detector 303 for detecting the timing when the correlation value becomes the maximum value, and a timing derivation section 304 which derives the optimum (causing no interference) timing based on the correlation between each of the signals pertaining to a plurality of different transmission systems. In this symbol synchronization section 105, detection can be performed as follows. The timing when the correlation value becomes the maximum value is detected by carrying out the correlation between the guard interval length (GI) using the signal delayed by a length of one symbol DFT interval and non-delayed signal, and then the optimum (causing no interference) timing based on the correlation between each of the signals pertaining to a plurality of different transmission systems, is derived. Moreover, since the power and the phase of the signal from the large cell sending radio station are generally considered to be fluctuating in time under the influence of phasing and the like, the accuracy of the symbol synchronization can be improved by averaging the detected timings when the correlation value becomes the maximum value.

Then, the symbol synchronization detection section 105 outputs the detected timing to a sending section 102. The sending section 102 modulates the data inputted from a data input terminal 4, to OFDM transmission signal, and sends the modulated signal by synchronizing with the timing inputted from the symbol synchronization detection section 105. As shown in FIG. 4, the synchronization of the timing is carried out such that no symbol boundary of the signals from the large cell sending radio station exists within one symbol of DFT interval of the signal sent by the small cell sending radio station. Therefore, the amount of the allowable out-of-synchronization is the guard interval length (GI). Moreover, at the timing of the synchronization, the delay occurring in a path from an antenna 3A to the symbol synchronization detection section 105 is taken into account.

In addition, the small cell sending radio station 101 can adopt a configuration that can correspond to not only OFDM transmission but also OFCDM. In this case, the small cell sending radio station 101 is further comprised of a reception quality measurement section 104 and a spread coefficient set up section 103 as shown with the dashed line in FIG. 3. Such a configuration will be described using FIG. 9B hereinafter.

Here, the configuration of the small cell sending radio station 101 will be described in more detail.

Figures 9A, 9B:
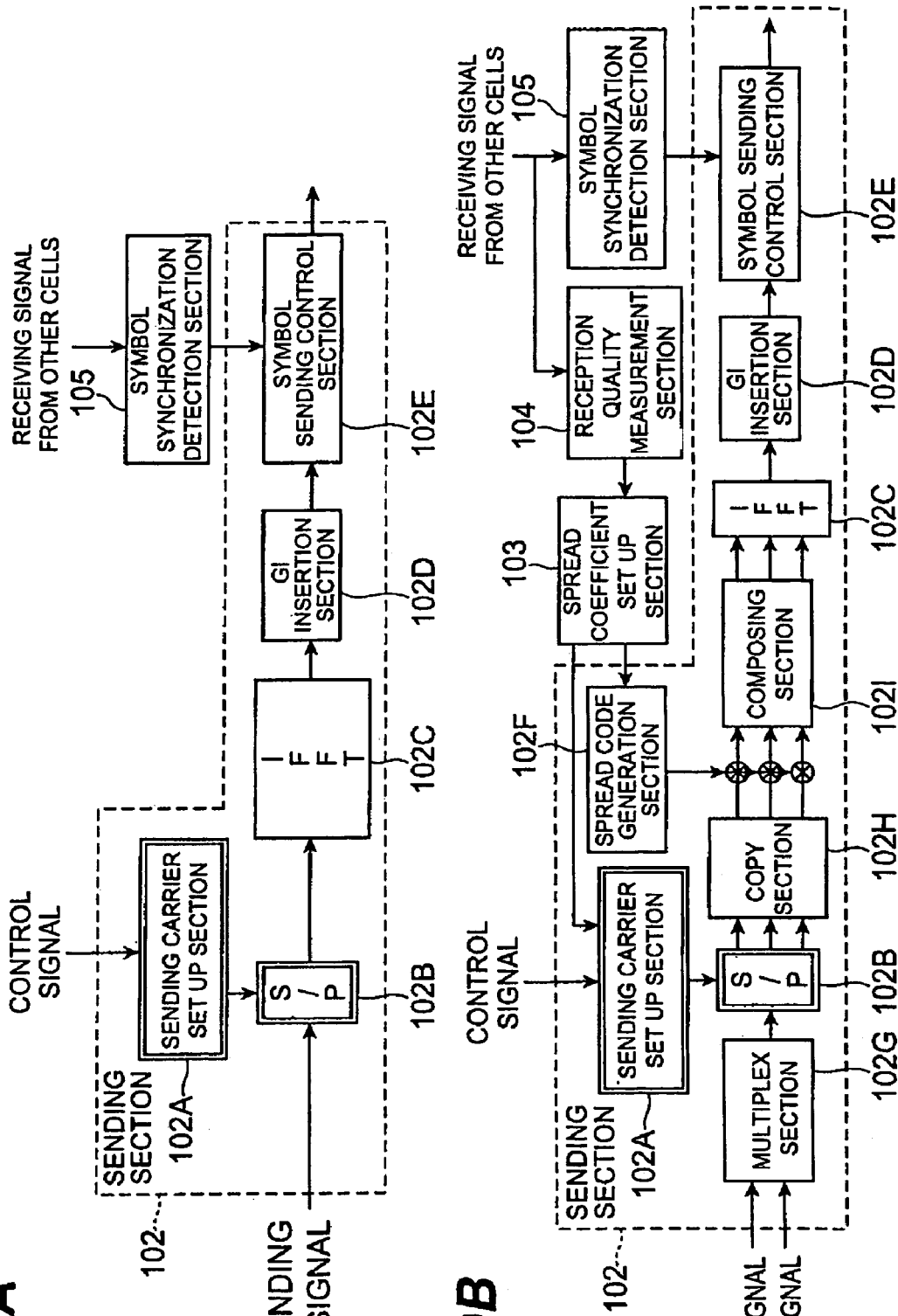
FIG. 9A is a functional block diagram showing the configuration related to the transmission of OFDM signal in a small cell sending radio station.
FIG. 9B is a functional block diagram showing the configuration related to the transmission of OFCDM signal in a small cell sending radio station.

The configuration related to the transmission of OFDM signal in the small cell sending radio station 101 is shown in FIG. 9A. The symbol synchronization detection section 105 shown in FIG. 9A has such a configuration as the above mentioned in FIG. 8, wherein the symbol synchronization is derived from the received signal from a large cell sending radio station such that the symbol boundary of the signal from the large cell sending base station does not exist in the DFT interval of one symbol.

Figure 1:
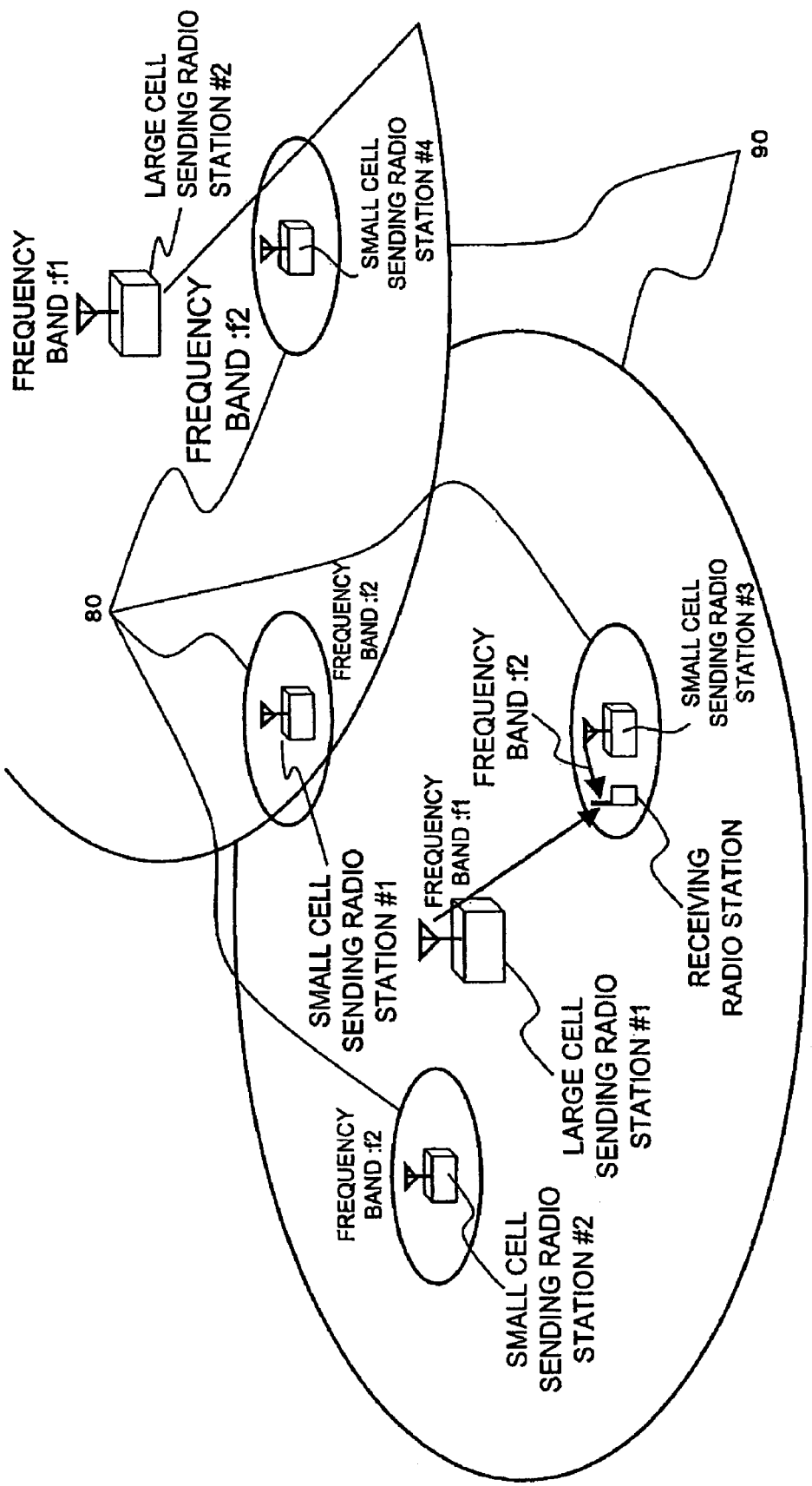
FIG. 1 is a view for describing a radio communication system comprising one or more of sending radio stations controlling a certain range of area, sending radio stations having small EIRP, and a receiving radio station.
Figure 2:
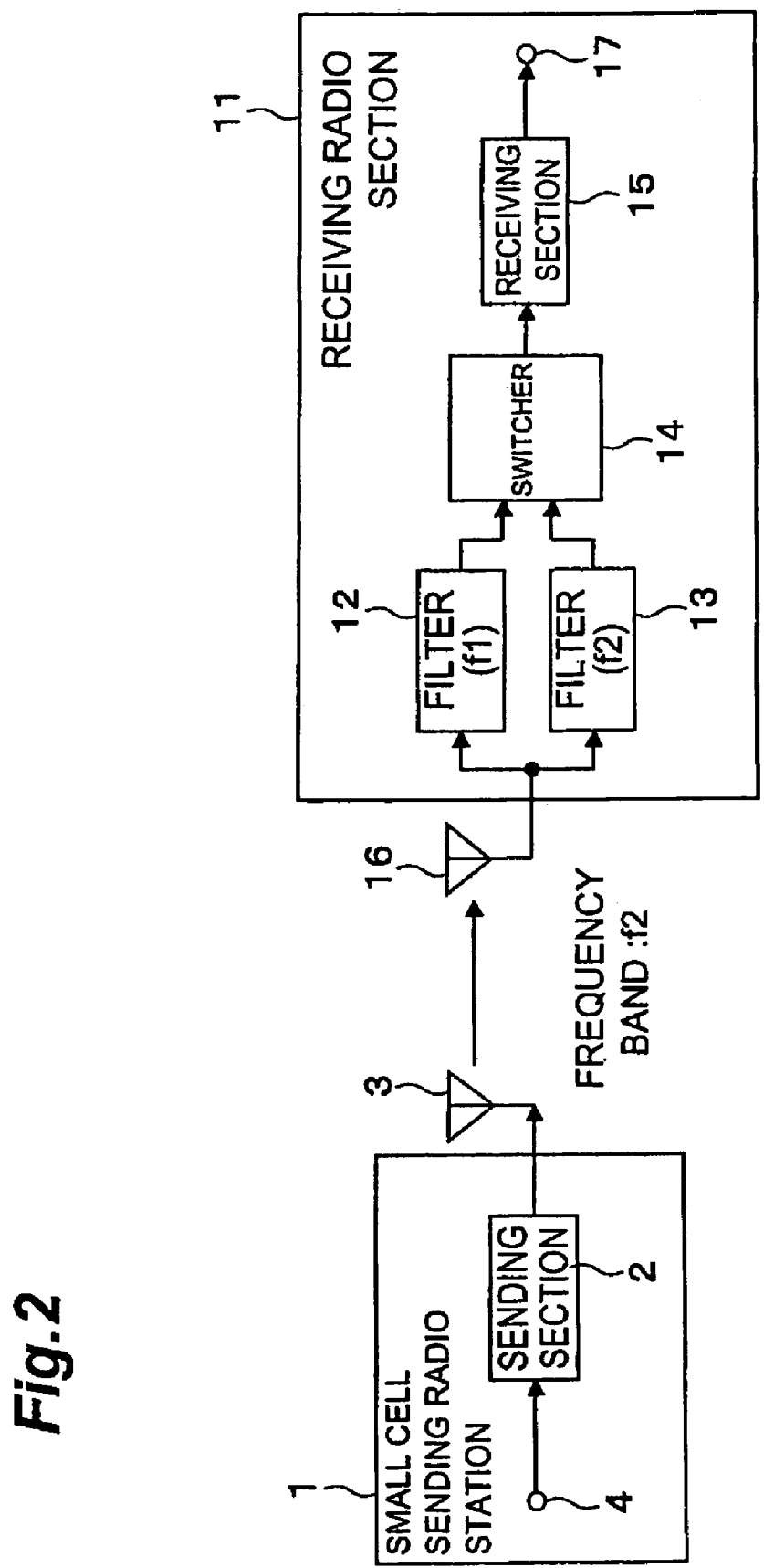
FIG. 2 is a view showing the functional block configuration of a sending radio station having small EIRP and a receiving radio station in the prior art.

On the other hand, a sending carrier set up section 102A sets up a subcarrier to be sent based on the number of sending carriers and the operating condition of the subcarrier given from the control signal from a control section (not shown). The symbol sequence, supposed to be sent by a sending radio station of a lower level cell (meaning a "sending radio station of a lower level cell in the hierarchical cell structure", and corresponding to the small cell sending station in FIG. 1), will be serial/parallel (S/P) converted by a serial/parallel conversion section 102B to the parallel data of all or a part of the number of the subcarrier based on the set up carrier information. Then, the symbol sequence converted to the parallel data will be time/frequency converted by inverse FFT (IFFT) processing by an IFFT section 102C, to multi-carrier components that are orthogonal in the frequency axis. Finally, a guard interval is inserted into the symbol of each subcarrier converted to the multi-carrier by a guard interval (GI) insertion section 102D. The insertion of this guard interval is achieved by copying the signal waveform corresponding to the FFT samples of the last of each symbol or in the symbol sequence, to the top of each symbol. Then, the above mentioned GI insertion section 102D outputs the modulated signal to a symbol transmission control section 102E, and the above mentioned symbol transmission control section 102E sends the modulated symbol sequence at the symbol synchronization timing that is outputted from the symbol synchronization detection section 105.

A configuration related to the transmission of OFCDM signal in the small cell sending radio station 101 is shown in FIG. 9B. The symbol synchronization detection section 105 shown in FIG. 9B has such a configuration as the above mentioned of FIG. 8, wherein the symbol synchronization is derived from the received signal from the large cell sending radio station such that no symbol boundary of the signal from the large cell sending base station exists within the DFT interval of one symbol.

Moreover, the received signal from the large cell sending radio station is also inputted to a reception quality measurement section 104 where the reception quality is measured. Based on the measured reception quality, a spread-coefficient set up section 103 judges whether the signal supposed to be sent by the sending radio station of a lower level cell is spread or not, and when having judged to be spread, the spread coefficient will be set up, and the signal is outputted to a spread code generation section 102F. The spread code generation section 102F assigns the spread code from the spread coefficient set up. In addition, there can be applied a general spread code assignment or a method described in the Japanese patent laid-open gazette, Heisei 10-290211, whereby a different spread code is assigned for each user with a different transmission speed or all techniques for assigning the spread code.

On the other hand, the symbol sequence (sending signal) supposed to be sent by the small cell sending radio station 101 is inputted to a multiplex section 102G, and pilot bits for the channel estimation are multiplexed by the multiplex section 102G. Moreover, the sending carrier set up section 102A sets up the subcarrier to be sent, based on the spread coefficient from the spread-coefficient set up section 103 as well as the number of the sending carrier and the operating condition of the subcarrier provided from the control section (not shown). The serial/parallel conversion section 102B serial/parallel (S/P) converts the above mentioned symbol sequence to the parallel data (all or a part of the number of the subcarrier/spread coefficient) based on the carrier information set up. The symbol sequence converted into the parallel data by the above mentioned serial/parallel conversion will be copied by a copy section 102H in the continuous subcarrier and time axis, from the relationship between the number of spread coefficients (SF) and the number of subcarrier. Specifically, when the spread coefficient SF is larger than the number of subcarrier, the symbol will be copied in the subcarrier and the time axis, and when the spread coefficient SF is smaller than the number of subcarrier, the symbol will be copied into a part of the subcarrier. At this time, the copy of the same symbols of SF pieces into the subcarriers can be implemented by repeatedly reading the symbol sequence that has been inputted into a memory.

After that, the same symbol sequence of SF pieces will be spread (scrambled) by a composing section 102I according to the uniquely assigned spread code of the spread coefficient SF. Then, the dimension pertaining to FFT processing is determined according to the number of subcarriers that are inputted by means of the control signal, and the spread symbol sequence corresponding to the number of subcarriers will be time/frequency converted by inverse FFT (IFFT) processing by IFFT section 102C, into the multi-carrier components orthogonal on the frequency axis. Finally, the guard interval is inserted in the symbol of each subcarrier that has been converted into the multi-carrier, by the guard interval insertion section 102D. The insertion of this guard interval is implemented by copying the signal waveform corresponding to FFT samples of the last of each symbol or within the symbol sequence, to the top of each symbol. Then, the above mentioned GI insertion section 102D outputs the modulated signal to the symbol transmission control section 102E, and the above mentioned symbol transmission control section 102E sends the modulated symbol sequence at the symbol synchronization timing that is outputted from the symbol synchronization detection section 105.

Next, the configuration and the operation of the receiving radio station 111 will be described.

Figure 3:
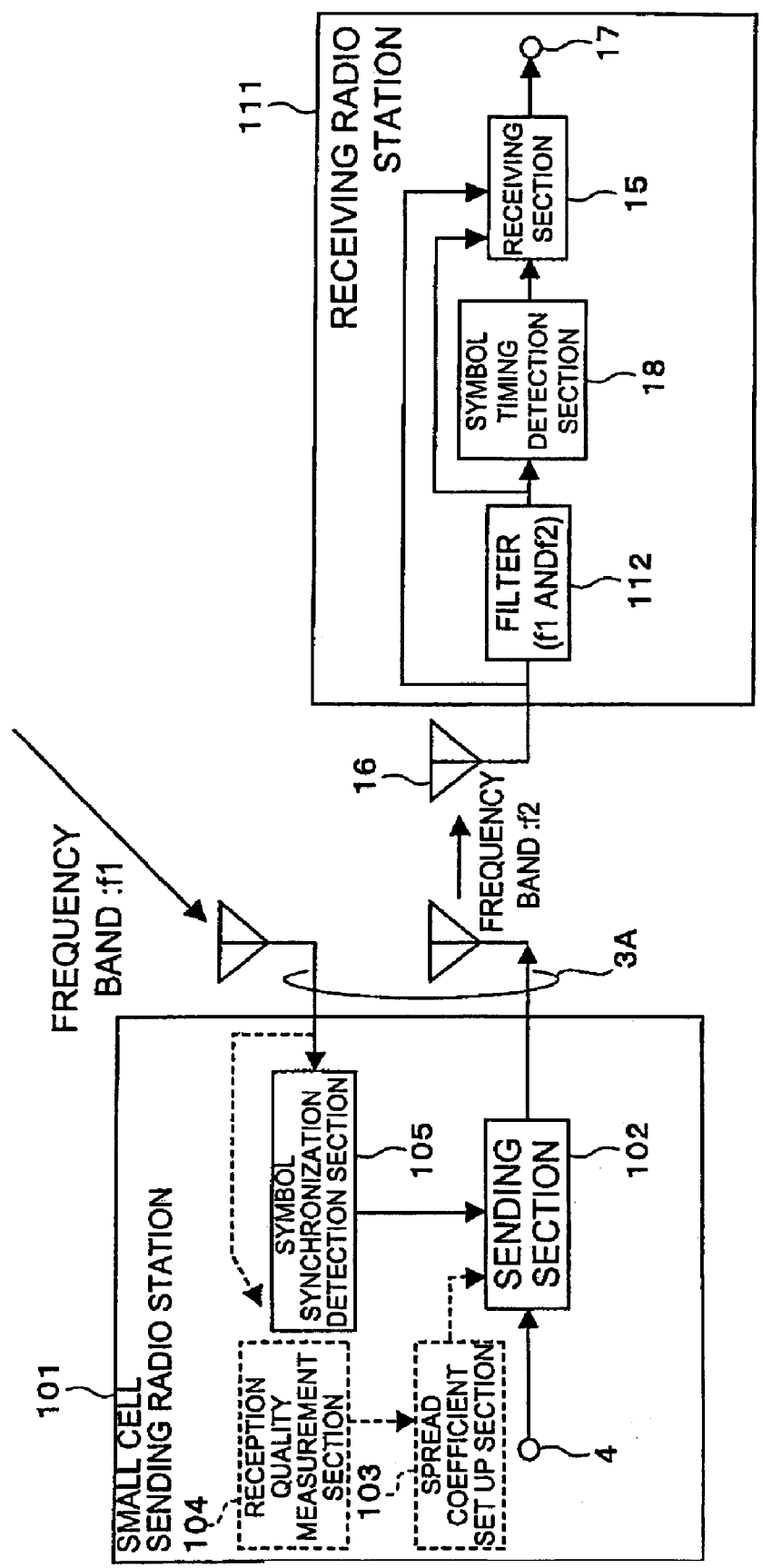
FIG. 3 is a view showing the functional block configuration of a sending radio station having small EIRP and a receiving radio station according to the first embodiment.
Figure 4:
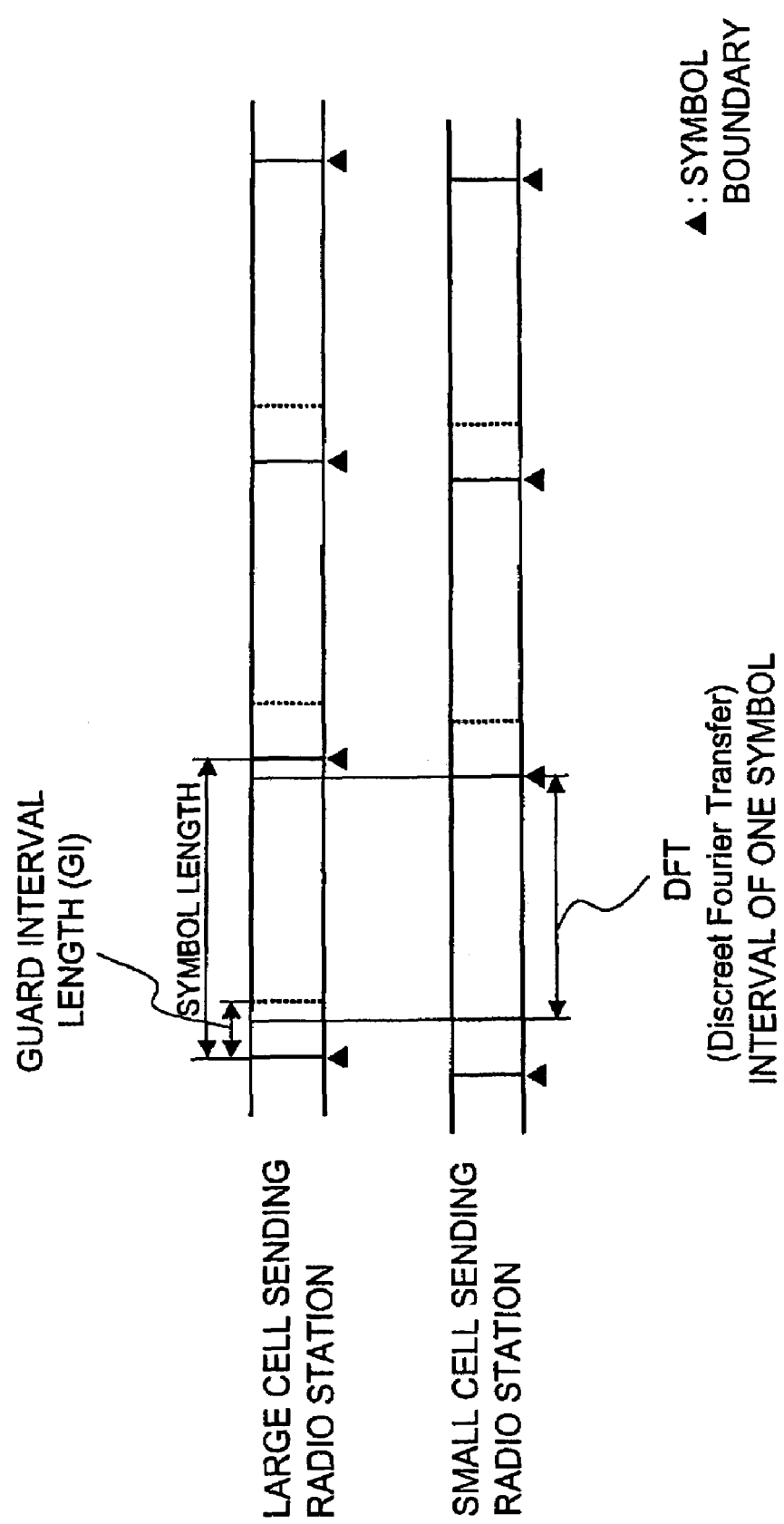
FIG. 4 is a view showing the timing relationship of the receiving symbol from a sending radio station controlling a certain range of area, and the sending symbol of a sending radio station having small EIRP.

As shown in FIG. 3, in the receiving radio station 111, the signal from an antenna 16 is inputted to a symbol timing detection section 18 through a filter 112 which passes both the frequency bands of the frequency band f1 and the frequency band f2, and the symbol timing (the timing when FFT processing is carried out, and also called "FFT window timing") is detected from the received multi-carrier signal.

Although a case with two frequency bands of the frequency bands f1 and f2 are described in the embodiment, such descriptive explanation can be adapted the case with three or more frequency bands. Moreover, the filter 112 is used in order to cut off the radio waves from other systems difficult of synchronization. The signals of the frequency band f1 and the frequency band f2 having passed the filter 112 will be demodulated respectively, after DFT (Discrete Fourier Transform) processing of both the frequency bands together is carried out in the receiving section 15. The configuration of the receiving section 15 will be described using FIG. 10A and FIG. 10B hereinafter.

Then, the signal demodulated by the receiving section 15 is outputted from a data output terminal 17. The data to be outputted at this time can be formed into the data to be transmitted by the frequency band f1 only, the frequency band f2 only or the frequency bands f1 and f2. Namely, since signals of a plurality of frequency bands can be simultaneously received according to the present invention, a smooth hand-over can be carried out.

Moreover, even when the received power from a large cell sending radio station fluctuates more greatly relative to the received power from the small cell sending radio station, like the cases where a small cell sending radio station is installed in a mobile body like a train or a bus, and the inside of the mobile body is regarded as the cell of a small cell sending radio station, the interference can be reduced by carrying out the synchronization of the symbol as described above, whereby the signals from the large cell sending radio station and the small cell sending radio station can be simultaneously demodulated.

Here, the configuration of the receiving radio station ill (especially, the receiving section 15) will be described in more detail.

The configuration related to the transmission of OFDM signal in the receiving radio station 111 is shown in FIG. 10A. As shown in FIG. 10A, the received signal from a large cell sending radio station is inputted to the symbol timing detection section 18 through the filter 112 which passes both the frequency bands of the frequency band f1 and the frequency band f2 (each frequency band fn in case of reception of three frequency bands or more from a large cell sending radio station), and the symbol timing (the timing when FFT processing is carried out, and also called "FFT window timing") is detected from the received multi-carrier signal. The detection of this symbol timing can be carried out by the detection of the correlation between the guard interval length. A guard interval removal section 15A removes the signal of the guard interval from the symbol timing detected by the symbol timing detection section 18 as mentioned above. Then, Discrete Fourier Transform (DFT) is carried out, for the removed signal by an FFT section 15B at the estimated FFT window timing, and then the signal is parallel/serial (P/S) converted into the parallel signal in a parallel/serial-conversion section 15G and inputted to a demodulation section 15D. In addition, a demodulation section 15D can be constituted in such a manner as to select some signals from the signals of the plurality of carrier frequency bands pertaining to different transmission systems and demodulate the signals.

In addition, the purpose of the above mentioned filter 112 is to remove the signals of the frequency bands except for the signals of the plurality of frequency bands desired to be simultaneously received. However, in case of reception of signals from a specific sending radio station of the upper layer cell (meaning a "sending radio station of the upper layer cell in the hierarchical cell structure", and corresponding to the large cell sending radio station in FIG. 1), needless to say, signals except for the required frequency bands can be removed by selecting the frequency band of the signals from a specific sending radio station. In this case, the filter 112 will set up the frequency bands to be filtered by means of the control signal from the control section (not shown), wherein furthermore, the frequency band subject to FFT processing varies, so that the FFT processing of the required frequency bands can be carried out by notifying the FFT section 15B of the dimension pertaining to the cross-correlation carried out by the above mentioned control signal.

A configuration related to the transmission of OFCDM signal in the receiving radio station 111 is shown in FIG. 10B. As shown in FIG. 10B, the received signal from the large cell sending radio station is inputted to the symbol timing detection section 18 through the filter 112 which passes both the frequency bands of the frequency band f1 and the frequency band f2 (each frequency band fn in case of reception of three or more frequency bands the large cell sending radio station), and the symbol timing (the timing when FFT processing is carried out, and also called "FFT window timing") is detected from the received multi-carrier signal. The detection of this symbol timing can be carried out by the detection of the correlation between the guard interval length. The guard interval removal section 15A removes the signal of the guard interval from the symbol timing detected by the symbol timing detection section 18 as mentioned above. Then, Discrete Fourier Transform (DFT) is carried out to the removed signal by the FFT section 15B at the estimated FFT window timing, and the channel impulse response (channel fluctuation) of each subcarrier is estimated by a channel estimation section 15E by using a pilot symbol. An in-phase summation section 15G carries out in-phase summation (namely, inverse spread) on the frequency axis, of OFCDM symbol of the subcarrier component of SF pieces from the spread codes which has been used for the channel estimation value of each of this subcarrier and the spread, and thereby generates an information symbol sequence. The information symbols of the inverse spread (the total number of subcarriers/spread coefficient) pieces are parallel/serial (P/S) converted by a parallel/serial conversion section 15C, and inputted to the demodulation section 15D. In addition, the demodulation section 15D can be constituted in such a manner as to select some signals from the signals of a plurality of carrier frequency bands pertaining to different transmission systems and demodulate the signals.

In addition, the purpose of the above mentioned filter 112 is to remove the signals of the frequency bands except for the signals of a plurality of frequency bands desired to be simultaneously received. However, in case of reception of signals from a specific sending radio station of the upper layer cell (meaning a "sending radio station of the upper layer cell in the hierarchical cell structure", and corresponding to the large cell sending radio station in FIG. 1), needless to say, signals except for the required frequency bands can be removed by selecting the frequency band of the signals from a specific sending radio station. In this case, the filter 112 will set up the frequency bands to be filtered by means of the control signal from the control section (not shown), wherein furthermore, the frequency band subject to FFT processing varies, so that the FFT processing of the required frequency bands can be carried out by notifying the FFT section 15B of the dimension pertaining to the cross-correlation carried out by the above mentioned control signal.

By the way, the processing in the sending radio station and the receiving radio station of the above-mentioned embodiment is also to be interpreted as the processing of a radio communications program executed by a computer provided in each radio station. Hereafter, the processing in the sending radio station (FIG. 11) and the processing in the receiving radio station (FIG. 12) will be described in due order.

Figure 11:
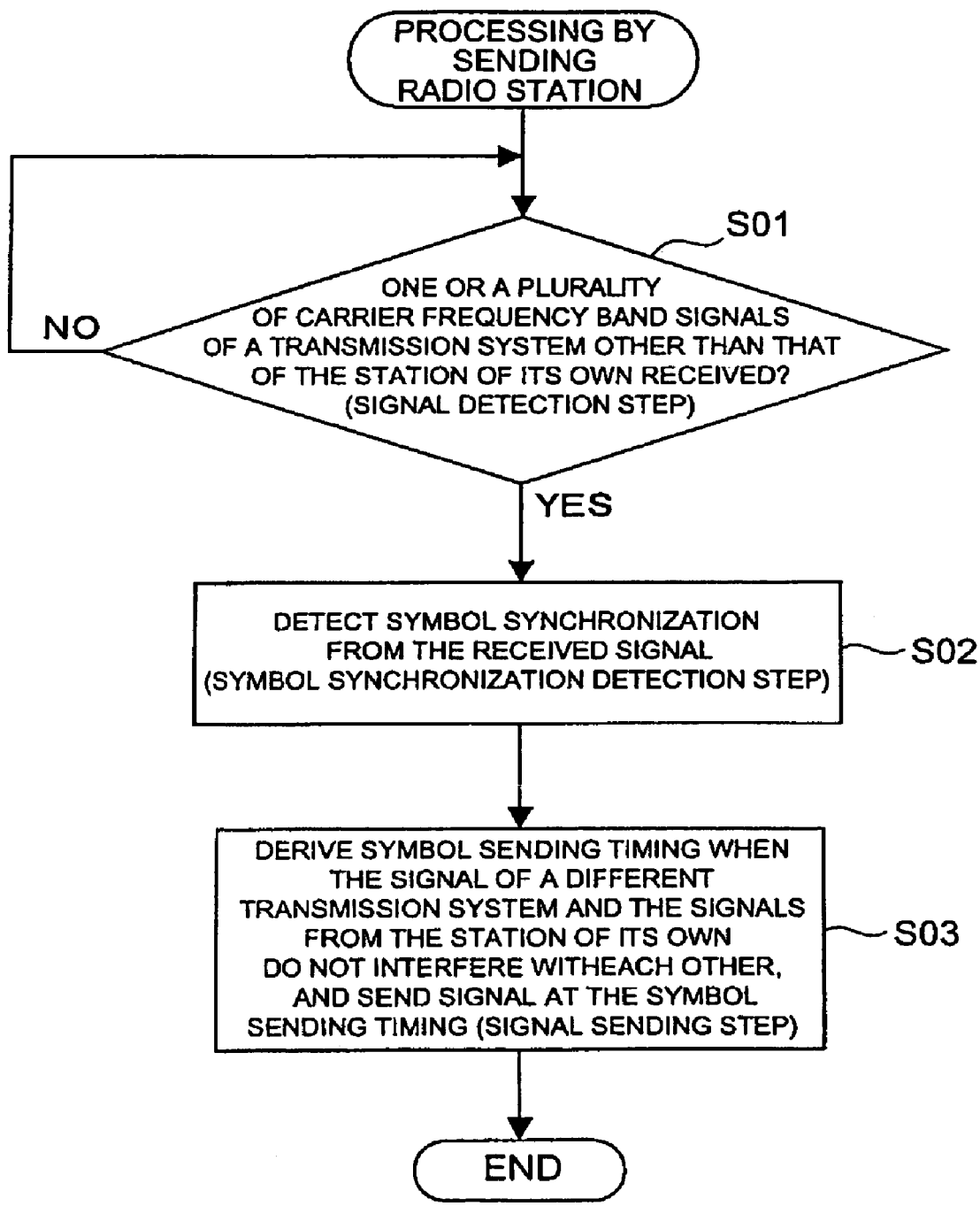
FIG. 11 is a flow chart showing an example of the processing of a radio communications program in a sending radio station.

The outline of the processing in the sending radio station can be expressed as shown in FIG. 11. As shown in FIG. 11, the sending radio station monitors whether one or more carrier frequency band signals of a transmission system other than that of the station of its own has been received or not (S01: signal detection step), and when the reception of the carrier frequency band signal of a different transmission system is detected, the sending symbol synchronization will be detected from the received signal (SO2: symbol synchronization detection step). Then, based on the detected symbol synchronization, the symbol sending timing when the carrier frequency band signal pertaining to the different transmission system and the signal from the station of its own do not interfere with each other, will be derived, and the signal to be sent at the symbol sending timing, will be sent (SO3: signal sending step).

Figure 12:
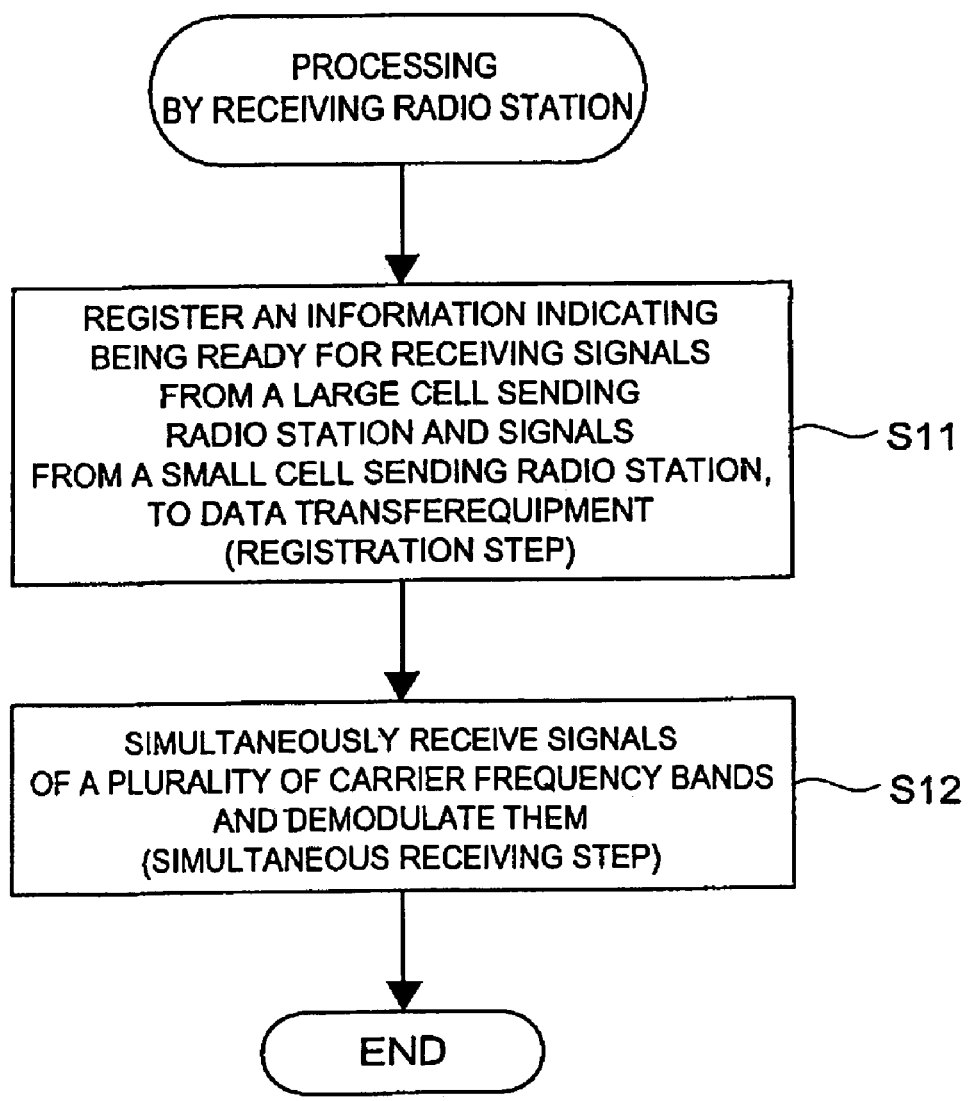
FIG. 12 is a flow chart showing an example of the processing of a radio communications program in a receiving radio station.

On the other hand, regarding the receiving radio station, the following distinctive processing that is carried out when the station of its own moves into a small scale cell in the hierarchical cell structure, can be interpreted as the processing of a radio communications program. As shown in FIG. 12, the receiving radio station registers an information indicating that the receiving radio station is ready for receiving the signal from the large cell sending radio station and ready for receiving the signal from a small cell sending radio station, to network data transfer device (for example, a location registration management server which implements the location registration of a receiving radio station in the network, or a router in the network, or the like) (S11: registration step). For example, the data transfer device selects the sending radio station, which sends the data according to the classification of the data to be sent to the receiving radio station. Thereby, the data transmission control corresponding to the classification of the data, can be carried out. For example, multicasting information is sent from a large cell sending radio station to the receiving radio station, and individual information of high data rate such as image data is sent from a small cell sending radio station to the receiving radio station. Moreover, needless to say, such a judgment for the above-mentioned matter in such a manner that the selection of the sending radio station can be judged corresponding to the amount of data and the traffic characteristics (for example, in non-real time or real time), can be performed. Therefore, the invention is not limited to the above-mentioned embodiment.

The receiving radio station which has received the signals of such plurality of carrier frequency bands, simultaneously received the signals and demodulated the signals (312: simultaneous receiving step).

Figure 7:
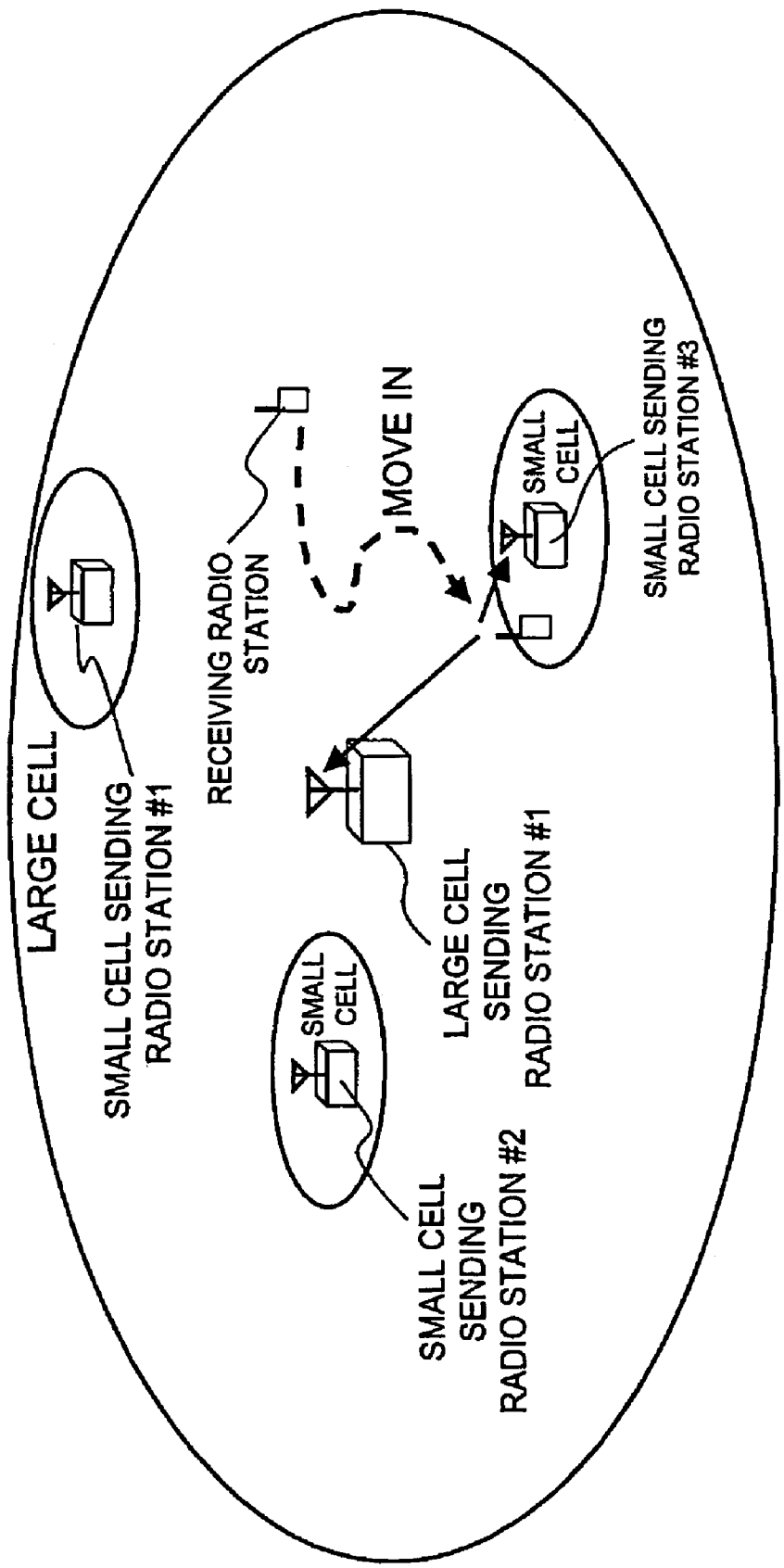
FIG. 7 is a view for describing location registration when moving into the cell of a small cell sending radio station having small EIRP.

For example, as shown in FIG. 7, when the receiving radio station has moved into a place where the signal from a small cell sending radio station can be received, the receiving radio station will notify the above mentioned data transfer device of having moved into the cell of a small cell sending radio station #3, through a large cell sending radio station #1 or a small cell sending radio station #3. Thereby the receiving radio station can always receive the data from the large cell sending radio station and from the small cell sending radio station, when the receiving radio station is located in the cell of this small cell sending radio station.

Accordingly, in the case of the transmission of the multicasting information which transmits the same information to a plurality of receiving radio stations located in a wide range of areas, the multicasting information can be sent from the large cell sending radio station, while in case of the transmission of a large capacity of information to a specific receiving radio station, the large capacity of information can be independently sent from the small cell sending radio station, respectively.

As mentioned above, the processing in the sending radio station and the receiving radio station according to the embodiment can be interpreted as the processing of a radio communications program executed by a computer provided in each radio station.

Figure 5:
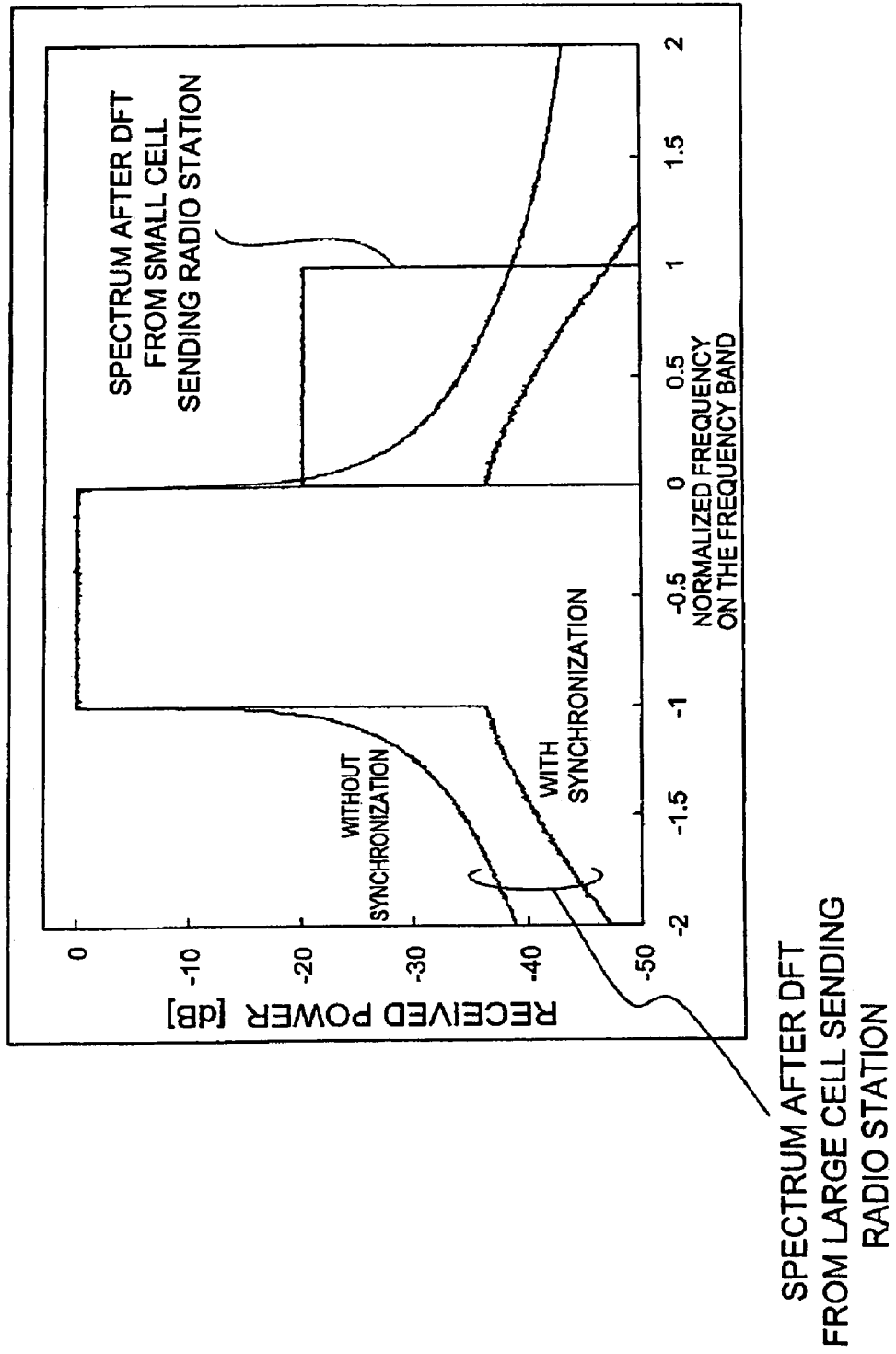
FIG. 5 is a view of the spectrum from a large cell sending radio station and the spectrum from a small cell sending radio station after DFT in a receiving radio station.

Next, the effect of the embodiment will be described using the figure of the spectrum from a large cell sending radio station and the spectrum from a small cell sending radio station after DFT in the receiving radio station of FIG. 5.

The set up of the DFT interval in the receiving radio station is synchronized with the signal from the small cell sending radio station. Moreover, no guard band is provided between the frequency bands used by the large cell sending radio station and the frequency band used by the small cell sending radio station. Namely, the interval of all subcarrier frequencies is identical. Since the cell radius of the large cell is larger than the cell radius of the small cell, the Equivalent Isotropically Radiated Power (EIRP) of the large cell sending radio station is larger than the EIRP of the small cell sending radio station. Therefore, in the receiving radio station located in the small cell which exists near the large cell sending radio station, as shown in FIG. 5, the radio wave from the large cell sending radio station is received with higher power.

The spectrum of a rectangle shape shown at the normalized frequency of 0 to 1 is the spectrum after DFT processing of the signal from the small cell sending radio station, while the spectrum of a rectangle shape shown at the normalized frequency of −1 to 0 is the spectrum after the DFT processing of the signal from the large cell sending radio station. Thus, it is understood that the amount of interference, which leaks into the frequency band used by the small cell sending radio station, can be reduced greatly by carrying out the synchronization according to the invention. Moreover, some occasional still remaining interference leaking into the frequency band despite of the synchronization carried out, is caused by the distortion of amplifiers. Since the interference caused by such distortion is equivalent to the state of increase in thermal noise, the interference can be reduced by carrying out spread modulation to cope with the interference caused by the above-mentioned distortion.

In addition, there can be employed an embodiment, wherein there is provided a synchronization request means requesting the symbol synchronization from the sending radio station in a receiving radio station and a sending radio station carries out the symbol synchronization detection and the sending timing control triggered upon the request of the symbol synchronization from the synchronization request means of the receiving radio station. In such a embodiment like the above, since the receiving radio station can simultaneously receive the signals of a plurality of carrier frequency bands and demodulate the signals, the "change processing of frequency" like in the prior art at the time of the hand-over is not needed, whereby a smooth hand-over can be achieved. Moreover, since the guard band can be set small or can be made unnecessary, the frequency can be effectively utilized. Moreover, since signals from a plurality of sending radio stations can be simultaneously received, the multi-link transmission can be carried out. Moreover, new sending radio stations can be freely arranged without much taking into consideration the influence of interference on other existing sending radio stations forming the small cell. Furthermore, since the components for receiving of the receiving radio station can be shared, the reduction of capacity of the receiving radio station as well as the reduction of manufacturing cost can be achieved.

Moreover, the sending radio station according to the present invention is not limited to the base station but can be a mobile station. When being applied to a pervasive network by multi-hop connection between a plurality of mobile stations, the synchronization request means of a mobile station (corresponding from the receiving radio station) requests the symbol synchronization to another mobile station (corresponding to the sending radio station), and another mobile station will carry out the symbol synchronization detection and sending timing control. Thereby autonomous sending timing control between the mobile stations can be achieved.

Furthermore, the accuracy (stability) of the symbol synchronization by the small cell sending radio station is considered to be higher than the accuracy (stability) of the symbol synchronization by the receiving radio station, since the small cell sending radio station is fixedly installed, its antenna gain is higher than that at the receiving radio station, and the installation environment of the antenna of the small cell sending radio station is better than the installation environment of the antenna of the receiving radio station. Moreover, it is assumed that on relatively many occasions there will be a environment with better line of sight communication between the small cell sending radio station and the receiving radio station as compared with that between the large cell sending radio station and the receiving radio station. Namely, it is assumed that the accuracy (stability) of the symbol synchronization in the receiving radio station is higher in the case where the symbol synchronization is carried out associated with the small cell sending radio station, than in the case where the symbol synchronization is carried out associated with the large cell sending radio station.

Accordingly, it is assumed that the receiving radio station can receive the signals from the large cell sending radio station more stably by carrying out the symbol synchronization associated with the small cell sending radio station (namely, the symbol can be equivalently synchronized associated with the large cell, by the symbol synchronization associated with the small cell sending radio station).

Second Embodiment

Figure 6:
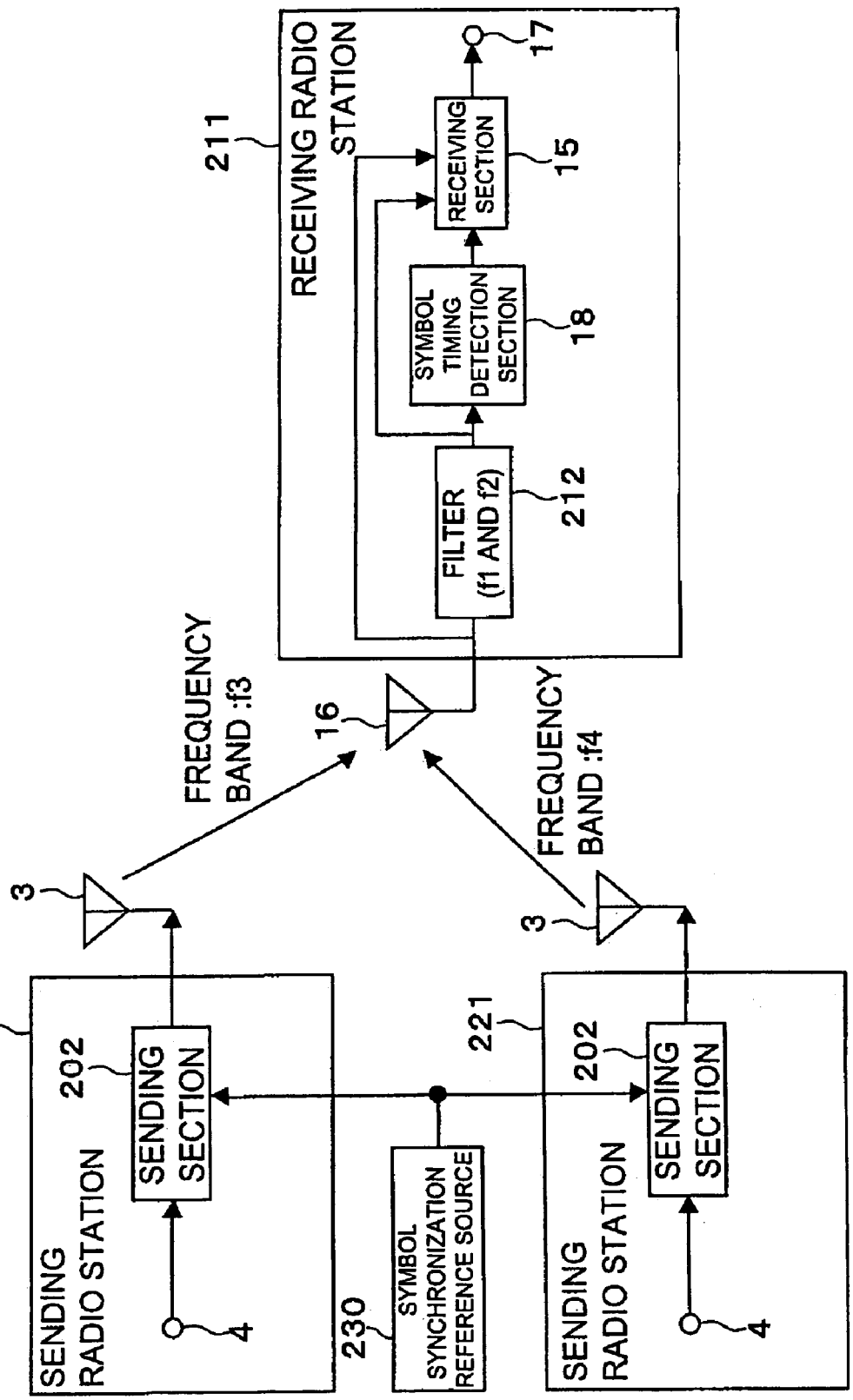
FIG. 6 is a view of the functional block configuration of a sending radio station and a receiving radio station according to the second embodiment.

Next, the second embodiment will be described using a view of the functional block configuration of the sending radio station and the receiving radio station of FIG. 6. This embodiment will be described as a case where a sending radio station uses a frequency band f3 and another sending radio station uses a frequency band f4. The sending radio station can be applied to both a large cell sending radio station and a small cell sending radio station. Moreover, although the case wherein two frequency bands are used will be described, such descriptive explanation is also adapted to the case wherein three or more frequency bands are used.

A sending section 202 of a sending radio station 201 and a sending section 202 of a sending radio station 221 will carry out the symbol synchronization for the sending symbols by means of the signal that is outputted from a symbol synchronization reference source 230. Namely, the data inputted from the data input terminal 4 of the sending radio station 201 and the data inputted from the data input terminal 4 of the sending radio station 221 will be sent such that the symbols thereof are synchronized with each other. As shown in FIG. 4, the synchronization of the symbol at this time is carried out such that no symbol boundary of the signal to be sent by another sending radio station exists in the DFT interval of one symbol. The symbol synchronization reference source 230 shown in FIG. 6 (especially the part for sending a synchronization request signal to the sending section 202) corresponds to "a synchronization request means" according to the invention. Moreover, although the symbol synchronization reference is independently prepared in this description, there can be adopted a method other than this, wherein the symbol synchronization reference is prepared in either one of sending radio stations, and sending radio stations without the symbol synchronization reference are synchronized with the sending radio station having the symbol synchronization reference. Moreover, there can be adopted a method, wherein there are provided the symbol synchronization references in all the sending radio stations, and the symbol synchronization is carried out by means of mutual linking between the symbol synchronization reference of the station of its own and the symbol synchronization reference of other sending radio stations via a cable or radio. At this time, it is desirable that each sending radio station links with each other to set up such that the sending carrier frequency of the signal to be sent by each sending radio station becomes orthogonal to each other. Namely, when the sending radio station is equipped with a frequency interval detection means for detecting the frequency interval based on the received signal from another sending radio station, and a frequency set up means for setting up the sending carrier frequency, based on the detected frequency interval, so as to acquire an orthogonal relationship with respect to the sending carrier frequency of the sending radio station, the sending radio station can send signals at the optimum (namely, causing no interference with each other) symbol sending timing by the correlation between the carrier frequency band signal of a transmission system other than that of the own station and the signal of the station of its own. An example of setting up the frequency will be described afterwards.

The signal from the antenna 16 is inputted to the receiving section 15 through the filter 112 that passes both the frequency bands of the frequency band f3 and the frequency band f4 in the receiving radio station 211. Then, the signal that is DFT transformed and demodulated by the receiving section 15 will be outputted from a data output terminal 17. The data to be outputted at this time can be formed into the data to be transmitted by the frequency band f3 only, the frequency band f4 only, or the frequency bands f3 and f4.

The following effects will be obtained by the application of this invention as described above in the first and the second embodiments. Namely, the sending radio station can send signals at the optimum (namely, causing no interference with each other) symbol sending timing by the correlation between the carrier frequency band signal of a transmission system other than that of the own station and the signal of the station of its own. And the receiving radio station can simultaneously receive signals of a plurality of carrier frequency bands and demodulate the signals. Therefore, there will be no need to carry out the "frequency switch over process" like in the prior art at the time of hand-over, thereby a smooth hand-over can be achieved.

Moreover, since the guard band can be set up small and can be made unnecessary, the frequency can be effectively utilized. Moreover, since signals from a plurality of sending radio stations can be simultaneously received, the multi-link transmission can be carried out. Moreover, new sending radio stations can be freely arranged without much taking into consideration the influence of interference on other existing sending radio stations forming a small cell. Furthermore, since the components for receiving of the receiving radio station which receive signals of the plurality of frequency bands, can be shared, the reduction of capacity of the receiving radio station and the reduction of manufacturing cost can be achieved.

By the way, an example of setting up the frequency will be described using FIGS. 13-15B. The received signal from other sending radio station such as a large cell sending radio station is multiplied with the signal from a local oscillator 317 by each of the multipliers 311A, 311B, and each multiplied signal is converted to the baseband signal ($r_I$, $r_Q$) by each of the low-pass filters 312A, 312B (the ($\pi/2$) phase-converted signal is input into the multiplier 311B) Each of the baseband signal ($r_I$, $r_Q$) is converted to the delayed baseband signal ($r_I$, $r_Q$) by each of the delay devices 313A, 313B. Next, each of the non-delayed baseband signal ($r_I$, $r_Q$) and each of the delayed baseband signal ($r_{-I}$, $r_{-Q}$) are multiplied with each other and the multiplied signals are added. This transaction corresponds to the transaction for multiplying the complex conjugate of the delayed complex vector with the non-delayed complex vector.

Figure 14A:
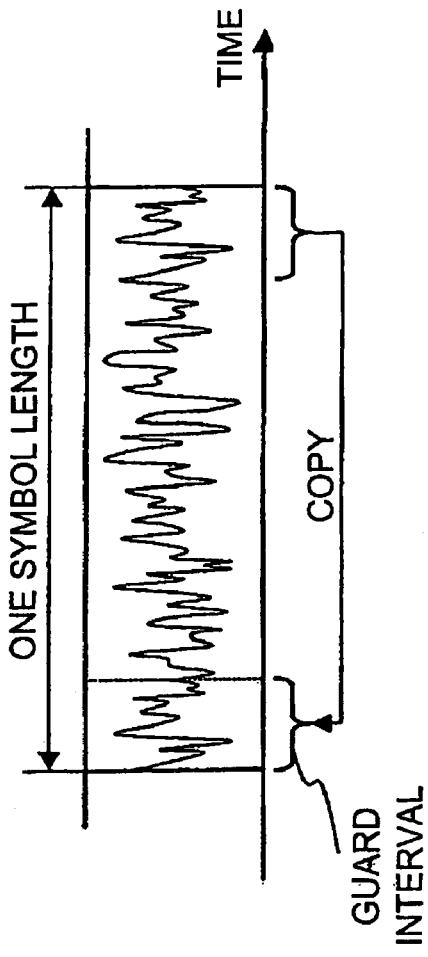
FIG. 14A is a view showing the copy of the part of OFDM signal.
Figure 14C:
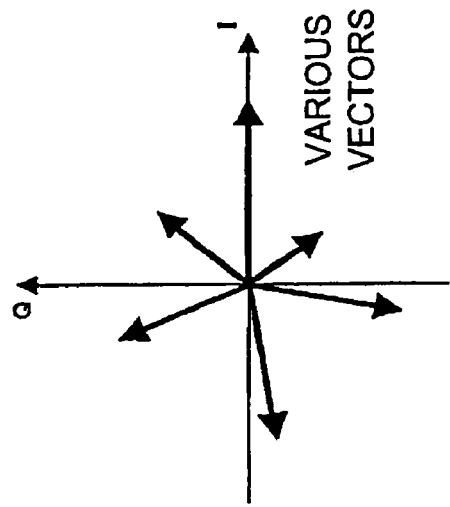
FIG. 14C is a view showing the vector when the multiplying timings are not identical to each other.
Figure 14B:
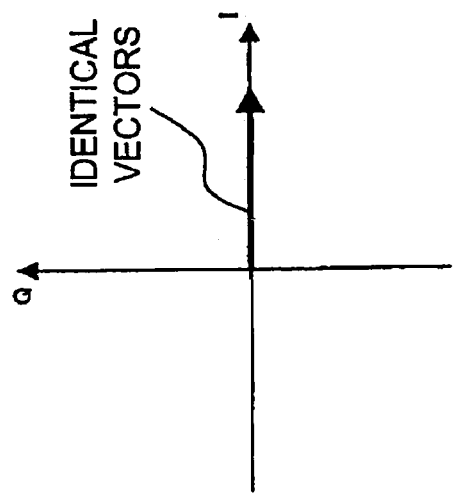
FIG. 14B is a view showing the vector when the multiplying timings are identical to each other.

Since part of the OFDM signal has been copied to the guard-interval part as shown in FIG. 14A, when the multiplying timings are identical to each other (when the signal is multiplied with the part to which the signal has been copied), the result will be a vector which does not fluctuate as time elapses on the complex plane as shown in FIG. 14B. Accordingly, at the integrators 314A, 314B which integrate vectors for guard-interval length, the addition of the same vectors is done, so the length of the integrated vector will become larger than the pre-determined threshold. On the other hand, when the multiplying timings are not identical to each other (when the signal is multiplied with the part other than the part to which the signal has been copied), the result will be a vector which fluctuates as time elapses on the complex plane as shown in FIG. 14C. Accordingly, the integration for the vectors on the same phase is not done, so the length of the integrated vector will become smaller than the pre-determined threshold. The timing when the length of the integrated vector is larger than the threshold and the length is the maximum value, will be the symbol timing for DFT.

Figure 13:
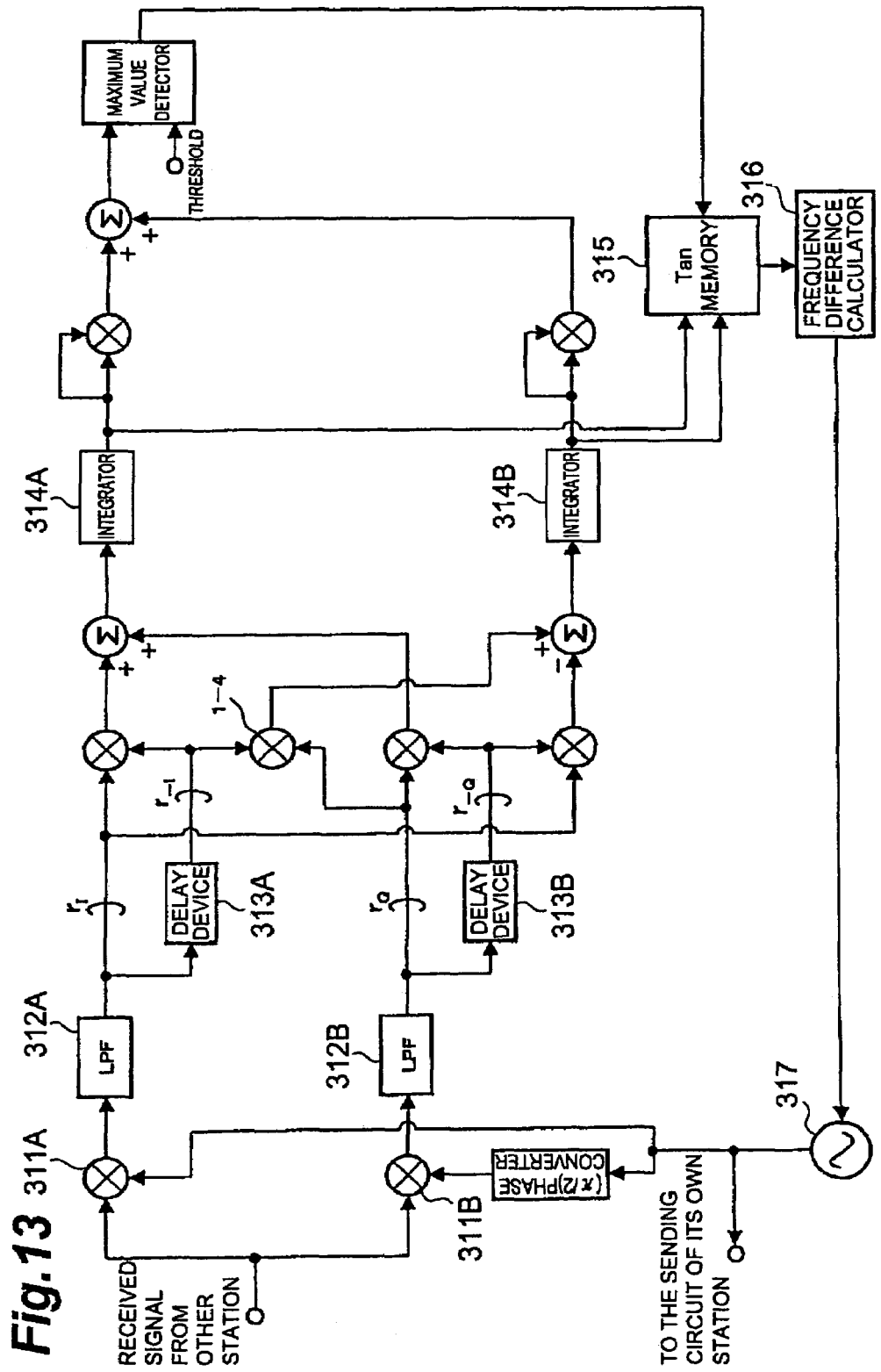
FIG. 13 is an explanatory view of an example for frequency setting.
Figure 15B:
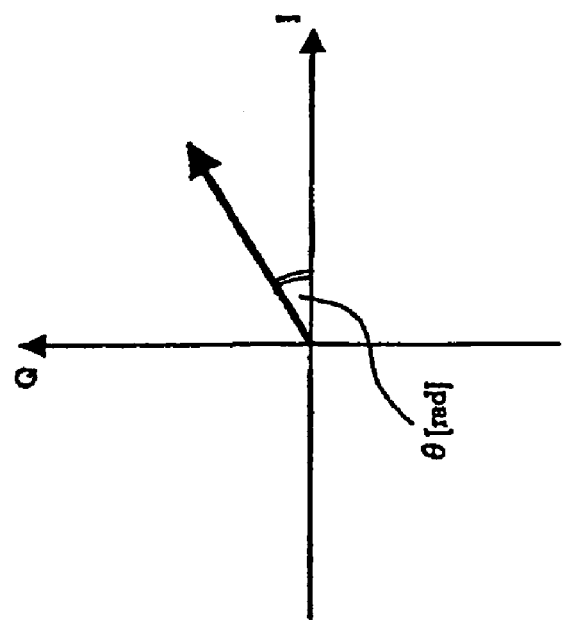
FIG. 15B is a view showing the vector when the multiplying timings are identical to each other and the frequency of the local oscillator is not identical to the frequency of every sub-carrier signal of the OFDM signal.
Figure 15A:
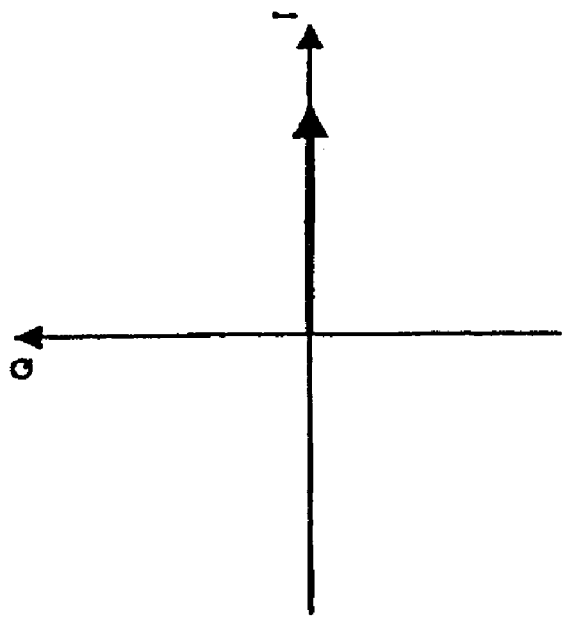
FIG. 15A is a view showing the vector when the multiplying timings are identical to each other and the frequency of the local oscillator is identical to the frequency of every sub-carrier signal of the OFDM signal.

But in case that the frequency of the local oscillator 317 is not identical to the frequency of every sub-carrier signal of the OFDM signal, even if symbol timings are identical to each other, the result will not be the vector which forms zero angle with I-axis as shown in FIG. 15A, but will be the vector which forms θ [radian] angle with I-axis as shown in FIG. 15B, because the phase rotates by the angle corresponding to the frequency difference at the DFT interval of one symbol set for the delay devices 313A, 313B. In FIG. 13, θ [radian] will be gotten through the search for the relationship between θ [radian] and the amplitude for each integrated signal memorized by the Tan memory 315. And the frequency difference calculator 316 will make the difference value Δf for different frequencies by the calculation according to the formula (1) described below.

$$\Delta f[Hz] = (1/2\pi) \times (\theta/T) \quad (1)$$

In this formula (1), Δf[Hz] means the minimum value of the difference between the frequency of the local oscillator 317 and the frequency of each sub-carrier signal of the OFDM signal, θ [radian] means the angle of deviation of the integrated vector, and T[sec] means the delayed time (DFT interval of one symbol) set for the delay devices 313A, 313B.

And the frequencies will be synchronized by amending the local oscillator 317 for the difference between the frequencies detected. Since the status where the frequencies are synchronized is the status where the local oscillator 317 of the sending radio station itself synchronized with the sending frequency of the signal from other sending radio station, the relationship between the sending carrier frequencies of the signals from the sending radio stations proves to be an orthogonal relationship by using the local oscillator 317 for the sending frequency of the signal which the sending radio station itself sends.

In addition, the small cell sending radio station in the first and the second embodiments can be a wireless LAN, and can be other radio communications network in a small area.

As described above, according to this invention, the sending radio station can send signals at the optimum (namely, causing no interference with each other) symbol sending timing by the correlation between the carrier frequency band signal of a transmission system other than that of the station of its own and the signal of the station of its own. Accordingly, since the receiving radio station can simultaneously receive signals of a plurality of carrier frequency bands and demodulate the signals, there will be no need to carry out the "frequency switch over process" like in the prior art at the time of hand-over, thereby a smooth hand-over can be achieved.

Moreover, since the guard band can be set small or can be made unnecessary, the frequency can be effectively utilized. Moreover, since signals from a plurality of sending radio stations can be simultaneously received, the multi-link transmission can be carried out. Moreover, new sending radio stations can be freely arranged without much taking into consideration the influence of interference of other existing sending radio stations forming the small cell. Furthermore, since the components for receiving of the receiving radio station which receive signals of the plurality of frequency bands, can be shared, the reduction of capacity of the receiving radio station and the reduction of manufacturing cost can be achieved.

What is claimed is:

1. A sending radio station to arrange symbols to be sent in the frequency axis and send signals to a radio terminal inside an area using one or a plurality of carrier frequency bands, in a radio communication system with a hierarchical cell structure, wherein the sending radio station comprises:

a signal detection means for detecting at least one carrier frequency band signal pertaining a transmission system other than that of its own station;

a symbol synchronization detection means for detecting sending-symbol synchronization based on at least one received signal on detecting the carrier frequency band signal pertaining to the transmission system other than that of its own station; and a signal sending means for sending the signal to be sent, based on the symbol sending timing derived based on the detected symbol synchronization.

2. The sending radio station according to claim 1 furthermore comprising a frequency interval detection means for detecting the frequency interval based on the received signal from a radio terminal, and a frequency set up means for setting up the sending carrier frequency, based on the detected frequency interval, so as to acquire an orthogonal relationship with respect to the sending carrier frequency of the radio terminal.

3. The sending radio station according to claim 1, furthermore comprising a reception quality measurement means to measure reception quality based on the received signal from the radio terminal, and a spread coefficient set up means to set up a spread coefficient based on the reception quality obtained by the measurement.

4. A receiving radio station configured to receive signals from a sending radio station, and to be located in a radio communication system with a hierarchical cell structure, wherein the receiving radio station comprises:

a simultaneous reception controller configured to simultaneously receive signals of a plurality of carrier frequency bands and demodulate the signals; and a synchronization requestor configured to request symbol synchronization to a sending radio station.

5. The receiving radio station according to claim 4, furthermore comprising a registration unit, wherein when the station of its own moves into a small scale cell in the hierarchical cell structure, the registration unit will register an information to a data transfer system in the radio communication system, the information indicating that the station of its own is ready for receiving signal from the sending radio station of a large scale cell controlling an area, and ready for receiving signal from the sending radio station of the small scale cell.

6. The receiving radio station according to claim 4, wherein the simultaneous reception controller selects signals of at least one carrier frequency band pertaining to another transmission system, and demodulates the signals.

7. The receiving radio station according to claim 4, further comprising a symbol timing detector.

8. A radio communication system with a hierarchical cell structure, comprised of a sending radio station to arrange symbols to be sent in the frequency axis and send signals to a radio terminal inside the area using one or a plurality of carrier frequency bands, and a receiving radio station which receives the signals from the sending radio station, wherein the sending radio station comprises:

a signal detection means for detecting at least one carrier frequency band signal pertaining to a transmission system other than that of its own station;

a symbol synchronization detection means for detecting sending-symbol synchronization based on at least one received signal on detecting the carrier frequency band signal pertaining to the transmission system other than that of its own station;

a signal sending means for sending the signal to be sent, at the symbol sending timing derived based on the detected symbol synchronization;

and the receiving radio station comprises a simultaneous reception control means for simultaneously receiving the signals of a plurality of carrier frequency bands and demodulating the signals.

9. The radio communication system according to claim 8 comprised of a plurality of sending radio stations using a plurality of different carrier frequency bands,
wherein the plurality of sending radio stations link each other over a cable or radio, and each sending radio station synchronously sends symbols of the signals to be sent.

10. The radio communication systems according to claim 9, wherein the plurality of sending radio stations link each other to set up such that the sending carrier frequency of the signal to be sent by each sending radio station becomes orthogonal to each other.

11. A radio communication system with a hierarchical cell structure, comprised of a sending radio station to arrange the symbol to be sent in the frequency axis and send signals to a radio terminal inside the area using one or a plurality of carrier frequency bands, and a receiving radio station which receives the signals from the sending radio station;
wherein the receiving radio station comprises:
a synchronization request means for requesting symbol synchronization to the sending radio station, and
a simultaneous reception control means for simultaneously receiving the signals of a plurality of carrier frequency bands and demodulating the signals,
and the sending radio station comprises:
a symbol synchronization detection means for detecting the sending symbol synchronization based on at least one received signal when a request of the symbol synchronization is received from the receiving radio station, and
a signal sending means for sending the signal to be sent, at the symbol sending timing derived based on the detected symbol synchronization.

12. A radio communication method applicable in a sending radio station to arrange symbols to be sent in the frequency axis and send signals to the radio terminal inside the area using one or a plurality of carrier frequency bands, in the radio communication system with a hierarchical cell structure,
wherein the radio communication method comprises:
a signal detection step wherein the sending radio station detects at least one carrier frequency band signal of a transmission system other than that of its own station;
a symbol synchronization detection step wherein the sending radio station detects the sending symbol synchronization based on at least one received signal, on detecting the carrier frequency band signal pertaining to the transmission system other than that of its own station;
a signal sending step wherein the sending radio station sends signals to be sent, at the symbol sending timing derived based on the detected symbol synchronization.

13. A radio communication method in a radio communication system with a hierarchical cell structure comprised of a sending radio station to arrange symbols to be sent in the frequency axis and send signals to a radio terminal inside the area using one or a plurality of carrier frequency bands, and a receiving radio station to receive signals from the sending radio station, wherein the radio communication method comprises:
a synchronization request step wherein the receiving radio station requests the symbol synchronization to the sending radio station;
a symbol synchronization detection step wherein the sending radio station detects the sending symbol synchronization based on at least one received signal, when the sending radio station receives a request of the symbol synchronization from the receiving radio station; and
a signal sending step wherein the sending radio station sends signals to be sent, at the symbol sending timing derived based on the detected symbol synchronization.

14. A sending radio station to arrange symbols to be sent in the frequency axis and send signals to a radio terminal inside an area using one or a plurality of carrier frequency bands, in a radio communication system with a hierarchical cell structure, wherein the sending radio station comprises:
a signal detector configured to detect at least one carrier frequency band signal pertaining to a transmission system other than that of its own station;
a symbol synchronization detector configured to detect sending-symbol synchronization based on at least one received signal on detecting the carrier frequency band signal pertaining to the transmission system other than that of its own station; and
a signal transmitter configured to send the signal to be sent, based on the symbol sending timing derived based on the detected symbol synchronization.

15. The sending radio station according to claim 14 further comprising a frequency interval detector configured to detect the frequency interval based on the received signal from a radio terminal, and a frequency manager configured to set the sending carrier frequency, based on the detected frequency interval, so as to acquire an orthogonal relationship with respect to the sending carrier frequency of the radio terminal.

16. The sending radio station according to claim 14, further comprising a reception quality measurer configured to measure reception quality based on the received signal from the radio terminal, and a spread coefficient manager configured to set a spread coefficient based on the reception quality obtained by the measurement.

17. A radio communication system with a hierarchical cell structure, comprised of a sending radio station to arrange symbols to be sent in the frequency axis and send signals to a radio terminal inside the area using one or a plurality of carrier frequency bands, and a receiving radio station which receives the signals from the sending radio station, wherein the sending radio station comprises:
a signal detector configured to detect at least one carrier frequency band signal pertaining to a transmission system other than that of its own station;
a symbol synchronization detector configured to detect sending-symbol synchronization based on at least one received signal on detecting the carrier frequency band signal pertaining to the transmission system other than that of its own station;
a signal transmitter configured to send the signal to be sent, at the symbol sending timing derived based on the detected symbol synchronization;
and the receiving radio station comprises a simultaneous reception receiver configured to simultaneously receive the signals of a plurality of carrier frequency bands and demodulating the signals.

18. The radio communication system according to claim 17 comprised of a plurality of sending radio stations using a plurality of different carrier frequency bands,
wherein the plurality of sending radio stations link each other over a cable or radio, and each sending radio station synchronously sends symbols of the signals to be sent.

19. The radio communication systems according to claim 18, wherein the plurality of sending radio stations link each other to set up such that the sending carrier frequency of the signal to be sent by each sending radio station becomes orthogonal to each other.

20. A radio communication system with a hierarchical cell structure, comprised of a sending radio station to arrange the symbol to be sent in the frequency axis and send signals to a radio terminal inside the area using one or a plurality of carrier frequency bands, and a receiving radio station which receives the signals from the sending radio station;

wherein the receiving radio station comprises:

a synchronization requestor configured to request symbol synchronization to the sending radio station, and a simultaneous reception controller configured to simultaneously receive the signals of a plurality of carrier frequency bands and demodulating the signals, and the sending radio station comprises:

a symbol synchronization detector configured to detect the sending symbol synchronization based on at least one received signal when a request of the symbol synchronization is received from the receiving radio station, and a signal transmitter configured to send the signal to be sent, at the symbol sending timing derived based on the detected symbol synchronization.

* * * * *